United States Patent
Siddiqui

(10) Patent No.: US 9,864,415 B2
(45) Date of Patent: Jan. 9, 2018

(54) MULTISTAGE FRICTION HINGE

(71) Applicant: Microsoft Technology Licensing, LLC, Redmond, WA (US)

(72) Inventor: Kabir Siddiqui, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 76 days.

(21) Appl. No.: 14/755,734

(22) Filed: Jun. 30, 2015

(65) Prior Publication Data

US 2017/0003719 A1  Jan. 5, 2017

(51) Int. Cl.
| | |
|---|---|
| G06F 1/16 | (2006.01) |
| H05K 5/00 | (2006.01) |
| H05K 7/00 | (2006.01) |
| E05D 11/08 | (2006.01) |
| F16M 11/10 | (2006.01) |
| E05D 1/04 | (2006.01) |

(52) U.S. Cl.
CPC ............. *G06F 1/1681* (2013.01); *E05D 1/04* (2013.01); *E05D 11/082* (2013.01); *E05D 11/084* (2013.01); *F16M 11/10* (2013.01); *G06F 1/1679* (2013.01); *E05D 2011/085* (2013.01); *E05Y 2900/606* (2013.01); *F16M 2200/022* (2013.01)

(58) Field of Classification Search
CPC ..... G06F 1/1626; G06F 1/1633; G06F 1/1681
USPC .............. 361/679.27, 679.28, 679.3, 679.59; 16/337–342
See application file for complete search history.

(56) References Cited

U.S. PATENT DOCUMENTS

| | | |
|---|---|---|
| 375,394 A | 12/1887 | Strachan |
| 457,824 A | 8/1891 | Curtis |
| 578,325 A | 3/1897 | Fleming |
| 2,056,805 A | 10/1936 | Reichard |
| 2,770,834 A | 11/1956 | Jannace |
| 4,046,975 A | 9/1977 | Seeger, Jr. |
| 4,065,649 A | 12/1977 | Carter et al. |
| 4,243,861 A | 1/1981 | Strandwitz |
| 4,302,648 A | 11/1981 | Sado et al. |

(Continued)

FOREIGN PATENT DOCUMENTS

| | | |
|---|---|---|
| CA | 990023 | 6/1976 |
| CN | 102112947 | 6/2011 |

(Continued)

OTHER PUBLICATIONS

"Adjustable Kickstand for SecureBack™ M Series Enclosures", Retrieved From: <http://www.kensington.com/ce/ca/4543/8589667786/adjustable-kickstand-for-secureback™-m-series-enclosures#.VQ_Z7_mUdT5> Mar. 25, 2015, 2012, 3 pages.

(Continued)

*Primary Examiner* — Anthony Haughton

(57) ABSTRACT

A multistage friction hinge is described. In at least some embodiments, the described hinge enables a support component to be adjustably attached to an apparatus. According to various embodiments, a hinge includes different activity stages where movement of the hinge is based on different activity mechanisms. For instance, the hinge includes different sets of components that form different friction engines that provide resistance to rotational and/or pivoting movement of the hinge.

20 Claims, 23 Drawing Sheets

(56) References Cited

U.S. PATENT DOCUMENTS

| | | |
|---|---|---|
| 4,317,011 A | 2/1982 | Mazurk |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,990,900 A | 2/1991 | Kikuchi |
| 5,008,497 A | 4/1991 | Asher |
| 5,107,401 A | 4/1992 | Youn |
| 5,128,829 A | 7/1992 | Loew |
| 5,220,521 A | 6/1993 | Kikinis |
| 5,235,495 A | 8/1993 | Blair et al. |
| 5,283,559 A | 2/1994 | Kalendra et al. |
| 5,331,443 A | 7/1994 | Stanisci |
| 5,375,076 A | 12/1994 | Goodrich et al. |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,861,990 A | 1/1999 | Tedesco |
| 5,874,697 A | 2/1999 | Selker et al. |
| 5,905,485 A | 5/1999 | Podoloff |
| 5,926,170 A | 7/1999 | Oba |
| 5,971,635 A | 10/1999 | Wise |
| 6,002,389 A | 12/1999 | Kasser |
| 6,002,581 A | 12/1999 | Lindsey |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,108,200 A | 8/2000 | Fullerton |
| 6,112,797 A | 9/2000 | Colson et al. |
| 6,125,509 A | 10/2000 | Hartigan et al. |
| 6,128,007 A | 10/2000 | Seybold |
| 6,141,388 A | 10/2000 | Servais et al. |
| 6,178,085 B1 | 1/2001 | Leung |
| 6,178,443 B1 | 1/2001 | Lin |
| 6,233,138 B1 | 5/2001 | Osgood |
| 6,254,105 B1 | 7/2001 | Rinde et al. |
| 6,279,060 B1 | 8/2001 | Luke et al. |
| 6,292,981 B1 | 9/2001 | Ford et al. |
| 6,329,617 B1 | 12/2001 | Burgess |
| 6,344,791 B1 | 2/2002 | Armstrong |
| 6,366,440 B1 | 4/2002 | Kung |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,856,789 B2 | 2/2005 | Pattabiraman et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,051,149 B2 | 5/2006 | Wang et al. |
| 7,083,295 B1 | 8/2006 | Hanna |
| 7,091,436 B2 | 8/2006 | Serban |
| 7,099,149 B2 | 8/2006 | Krieger et al. |
| 7,106,222 B2 | 9/2006 | Ward et al. |
| 7,123,292 B1 | 10/2006 | Seeger et al. |
| 7,152,985 B2 | 12/2006 | Benitez et al. |
| D535,292 S | 1/2007 | Shi et al. |
| 7,192,105 B2 | 3/2007 | Jung |
| 7,194,662 B2 | 3/2007 | Do et al. |
| 7,213,991 B2 | 5/2007 | Chapman et al. |
| 7,232,098 B2 | 6/2007 | Rawlings et al. |
| 7,239,505 B2 | 7/2007 | Keely et al. |
| 7,260,221 B1 | 8/2007 | Atsmon |
| 7,277,087 B2 | 10/2007 | Hill et al. |
| 7,301,759 B2 | 11/2007 | Hsiung |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,543,358 B2 * | 6/2009 | Lin ............... E05D 11/087 16/319 |
| 7,558,594 B2 | 7/2009 | Wilson |
| 7,559,834 B1 | 7/2009 | York |
| RE40,891 E | 9/2009 | Yasutake |
| 7,594,638 B2 | 9/2009 | Chan et al. |
| 7,636,921 B2 | 12/2009 | Louie |
| 7,639,876 B2 | 12/2009 | Clary et al. |
| 7,656,392 B2 | 2/2010 | Bolender |
| 7,729,493 B2 | 6/2010 | Krieger et al. |
| 7,731,147 B2 | 6/2010 | Rha |
| 7,733,326 B1 | 6/2010 | Adiseshan |
| 7,761,119 B2 | 7/2010 | Patel |
| 7,777,972 B1 | 8/2010 | Chen et al. |
| 7,782,342 B2 | 8/2010 | Koh |
| 7,813,715 B2 | 10/2010 | McKillop et al. |
| 7,822,338 B2 | 10/2010 | Wernersson |
| 7,865,639 B2 | 1/2011 | McCoy et al. |
| 7,884,807 B2 | 2/2011 | Hovden et al. |
| 7,913,357 B2 | 3/2011 | Peng et al. |
| D636,397 S | 4/2011 | Green |
| 7,928,964 B2 | 4/2011 | Kolmykov-Zotov et al. |
| 7,944,520 B2 | 5/2011 | Ichioka et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,065,624 B2 | 11/2011 | Morin et al. |
| 8,069,356 B2 | 11/2011 | Rathi et al. |
| 8,074,956 B2 | 12/2011 | Wang et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |

(56) References Cited

U.S. PATENT DOCUMENTS

| | | | |
|---|---|---|---|
| 8,224,405 B2 | 7/2012 | Lombardi et al. |
| 8,229,509 B2 | 7/2012 | Paek et al. |
| 8,229,522 B2 | 7/2012 | Kim et al. |
| 8,230,992 B2 | 7/2012 | Law et al. |
| 8,231,099 B2 | 7/2012 | Chen |
| 8,243,432 B2 | 8/2012 | Duan et al. |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |
| 8,335,079 B2* | 12/2012 | Yeh .................. H04M 1/0216 345/156 |
| 8,387,078 B2 | 2/2013 | Memmott |
| 8,387,938 B2 | 3/2013 | Lin |
| 8,390,995 B2* | 3/2013 | Wang .................. G06F 1/166 361/679.03 |
| 8,403,288 B2 | 3/2013 | Cheng |
| 8,416,559 B2 | 4/2013 | Agata et al. |
| 8,424,160 B2 | 4/2013 | Chen |
| 8,498,100 B1 | 7/2013 | Whitt, III et al. |
| 8,514,568 B2 | 8/2013 | Qiao et al. |
| 8,520,371 B2 | 8/2013 | Peng et al. |
| 8,523,131 B2 | 9/2013 | Derry et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,599,542 B1 | 12/2013 | Healey et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,699,215 B2 | 4/2014 | Whitt, III et al. |
| 8,719,603 B2 | 5/2014 | Belesiu |
| 8,724,302 B2 | 5/2014 | Whitt et al. |
| 8,744,070 B2 | 6/2014 | Zhang et al. |
| 8,744,391 B2 | 6/2014 | Tenbrook et al. |
| 8,767,388 B2 | 7/2014 | Ahn et al. |
| 8,797,765 B2 | 8/2014 | Lin et al. |
| 8,891,232 B2 | 11/2014 | Wang |
| 8,908,858 B2 | 12/2014 | Chiu et al. |
| 8,934,221 B2 | 1/2015 | Guo |
| 8,939,422 B2 | 1/2015 | Liu et al. |
| 8,964,376 B2 | 2/2015 | Chen |
| 9,198,312 B2 | 11/2015 | Zhang et al. |
| 9,447,620 B2 | 9/2016 | Park et al. |
| 2002/0044216 A1 | 4/2002 | Cha |
| 2002/0134828 A1 | 9/2002 | Sandbach et al. |
| 2003/0160712 A1 | 8/2003 | Levy |
| 2003/0163611 A1 | 8/2003 | Nagao |
| 2003/0197687 A1 | 10/2003 | Shetter |
| 2003/0222848 A1 | 12/2003 | Solomon et al. |
| 2004/0056843 A1 | 3/2004 | Lin et al. |
| 2004/0156168 A1 | 8/2004 | LeVasseur et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0099400 A1 | 5/2005 | Lee |
| 2005/0134717 A1 | 6/2005 | Misawa |
| 2005/0146512 A1 | 7/2005 | Hill et al. |
| 2005/0204509 A1* | 9/2005 | Lin .................. E05D 11/087 16/342 |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0227393 A1 | 10/2006 | Herloski |
| 2006/0272128 A1 | 12/2006 | Rude |
| 2007/0003267 A1 | 1/2007 | Shibutani |
| 2007/0056385 A1 | 3/2007 | Lorenz |
| 2007/0062089 A1* | 3/2007 | Homer .................. G06F 1/1616 40/754 |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0164191 A1 | 7/2007 | Kim |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0200830 A1 | 8/2007 | Yamamoto |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0053222 A1 | 3/2008 | Ehrensvard et al. |
| 2008/0059888 A1 | 3/2008 | Dunko |
| 2008/0104437 A1 | 5/2008 | Lee |
| 2008/0151478 A1 | 6/2008 | Chern |
| 2008/0158185 A1 | 7/2008 | Westerman |
| 2008/0174570 A1 | 7/2008 | Jobs et al. |
| 2008/0186660 A1 | 8/2008 | Yang |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0140985 A1 | 6/2009 | Liu |
| 2009/0195497 A1 | 8/2009 | Fitzgerald et al. |
| 2009/0231275 A1 | 9/2009 | Odgers |
| 2009/0244872 A1 | 10/2009 | Yan |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0072334 A1 | 3/2010 | Le Gette et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0133414 A1 | 6/2010 | Lee et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |

(56) References Cited

U.S. PATENT DOCUMENTS

| | | |
|---|---|---|
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0259876 A1 | 10/2010 | Kim |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0025176 A1 | 2/2011 | McClure et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102752 A1 | 5/2011 | Chen et al. |
| 2011/0115713 A1 | 5/2011 | Altman et al. |
| 2011/0134032 A1 | 6/2011 | Chiu et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0265287 A1 | 11/2011 | Li et al. |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0161406 A1 | 6/2012 | Mersky |
| 2012/0162693 A1 | 6/2012 | Ito |
| 2012/0175487 A1 | 7/2012 | Goto |
| 2012/0176741 A1* | 7/2012 | Wu .................. G06F 1/1601 361/679.09 |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0194972 A1 | 8/2012 | Bohn et al. |
| 2012/0215284 A1 | 8/2012 | Berg et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0300275 A1 | 11/2012 | Vilardell et al. |
| 2012/0312955 A1 | 12/2012 | Randolph |
| 2012/0326003 A1 | 12/2012 | Solow et al. |
| 2013/0009413 A1 | 1/2013 | Chiu et al. |
| 2013/0015311 A1 | 1/2013 | Kim |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0100597 A1 | 4/2013 | Berg et al. |
| 2013/0106766 A1 | 5/2013 | Yilmaz et al. |
| 2013/0162554 A1 | 6/2013 | Lauder et al. |
| 2013/0172906 A1 | 7/2013 | Olson et al. |
| 2013/0193292 A1 | 8/2013 | Hsu et al. |
| 2013/0217451 A1 | 8/2013 | Komiyama et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |

(56) References Cited

U.S. PATENT DOCUMENTS

| | | | |
|---|---|---|---|
| 2013/0304941 A1 | 11/2013 | Drasnin |
| 2013/0321992 A1 | 12/2013 | Liu et al. |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0335891 A1 | 12/2013 | Chen et al. |
| 2013/0339757 A1 | 12/2013 | Reddy |
| 2013/0342976 A1 | 12/2013 | Chung |
| 2014/0012401 A1 | 1/2014 | Perek et al. |
| 2014/0021727 A1 | 1/2014 | Mai et al. |
| 2014/0029180 A1 | 1/2014 | Nishimura et al. |
| 2014/0036429 A1 | 2/2014 | Bryan et al. |
| 2014/0036430 A1 | 2/2014 | Wroblewski et al. |
| 2014/0043275 A1 | 2/2014 | Whitman |
| 2014/0047672 A1 | 2/2014 | Saito et al. |
| 2014/0048399 A1 | 2/2014 | Whitt, III |
| 2014/0076748 A1 | 3/2014 | Padilla et al. |
| 2014/0083883 A1 | 3/2014 | Elias |
| 2014/0085814 A1 | 3/2014 | Kielland |
| 2014/0119802 A1 | 5/2014 | Shaw |
| 2014/0132550 A1 | 5/2014 | McCracken et al. |
| 2014/0167585 A1 | 6/2014 | Kuan et al. |
| 2014/0174960 A1 | 6/2014 | Zho |
| 2014/0263939 A1 | 9/2014 | Rinner |
| 2014/0293534 A1 | 10/2014 | Siddiqui |
| 2014/0317882 A1 | 10/2014 | Chen et al. |
| 2014/0376179 A1 | 12/2014 | Jenkins et al. |
| 2015/0022961 A1 | 1/2015 | Jenkins et al. |
| 2015/0212553 A1 | 7/2015 | Park et al. |
| 2015/0311014 A1 | 10/2015 | Shaw et al. |
| 2016/0090767 A1 | 3/2016 | Park et al. |
| 2017/0068284 A1 | 3/2017 | Park et al. |
| 2017/0284457 A1 | 10/2017 | Park |

FOREIGN PATENT DOCUMENTS

| | | |
|---|---|---|
| CN | 202441167 | 9/2012 |
| CN | 103455149 | 12/2013 |
| DE | 10116556 | 10/2002 |
| DE | 202010005274 | 7/2010 |
| EP | 1223722 | 7/2002 |
| EP | 1591891 | 11/2005 |
| EP | 1983411 | 10/2008 |
| EP | 2353978 | 8/2011 |
| GB | 2068643 | 8/1981 |
| GB | 2123213 | 1/1984 |
| JP | 56108127 | 8/1981 |
| JP | 10326124 | 12/1998 |
| JP | 1173239 | 3/1999 |
| JP | 2006294361 | 10/2006 |
| KR | 1020110087178 | 8/2011 |
| WO | WO-9845769 | 10/1998 |
| WO | WO-9919995 | 4/1999 |
| WO | WO-2005064436 | 7/2005 |
| WO | WO-2006044818 | 4/2006 |
| WO | WO-2009034484 | 3/2009 |
| WO | WO-2014209383 | 12/2014 |

OTHER PUBLICATIONS

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, dated Feb. 24, 2014, 2 pages.

"Advisory Action", U.S. Appl. No. 14/199,924, dated May 28, 2014, 2 pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University, 1999, 14 Pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, dated Apr. 9, 2013, 2 pages.

"Corrected Notice of Allowance", U.S. Appl. No. 13/470,633, dated Jul. 2, 2013, 2 pages.

"Corrected Notice of Allowance", U.S. Appl. No. 13/563,435, dated Jan. 14, 2014, 2 pages.

"Corrected Notice of Allowance", U.S. Appl. No. 13/563,435, dated Mar. 20, 2014, 2 pages.

"Corrected Notice of Allowance", U.S. Appl. No. 13/563,435, dated Jan. 22, 2014, 2 pages.

"Corrected Notice of Allowance", U.S. Appl. No. 13/565,124, dated Apr. 3, 2014, 4 pages.

"Corrected Notice of Allowance", U.S. Appl. No. 13/565,124, dated Mar. 10, 2014, 2 pages.

"Corrected Notice of Allowance", U.S. Appl. No. 13/565,124, dated Apr. 14, 2014, 2 pages.

"Corrected Notice of Allowance", U.S. Appl. No. 13/651,327, dated Sep. 12, 2013, 2 pages.

"Corrected Notice of Allowance", U.S. Appl. No. 13/651,327, dated Sep. 23, 2013, 2 pages.

"Corrected Notice of Allowance", U.S. Appl. No. 13/651,726, dated Sep. 17, 2013, 2 pages.

"Corrected Notice of Allowance", U.S. Appl. No. 13/938,930, dated May 6, 2014, 2 pages.

"Corrected Notice of Allowance", U.S. Appl. No. 13/938,930, dated Jun. 6, 2014, 2 pages.

"Corrected Notice of Allowance", U.S. Appl. No. 13/939,002, dated May 22, 2014, 2 pages.

"Corrected Notice of Allowance", U.S. Appl. No. 13/939,002, dated May 5, 2014, 2 pages.

"DR2PA", retrieved from <http://vvww.architainment.co.uk/wp-content/uploads/2012/08/DR2PA-AU-US-size-Data-Sheet-Rev-H_LOGO.pdf> on Sep. 17, 2012, Jan. 2012, 4 pages.

"Final Office Action", U.S. Appl. No. 13/471,001, dated Jul. 25, 2013, 20 pages.

"Final Office Action", U.S. Appl. No. 13/471,139, dated Sep. 16, 2013, 13 pages.

"Final Office Action", U.S. Appl. No. 13/471,336, dated Aug. 28, 2013, 18 pages.

"Final Office Action", U.S. Appl. No. 13/564,520, dated Jan. 15, 2014, 7 pages.

"Final Office Action", U.S. Appl. No. 13/651,195, dated Apr. 18, 2013, 13 pages.

"Final Office Action", U.S. Appl. No. 13/651,232, dated May 21, 2013, 21 pages.

"Final Office Action", U.S. Appl. No. 13/651,287, dated May 3, 2013, 16 pages.

"Final Office Action", U.S. Appl. No. 13/651,976, dated Jul. 25, 2013, 21 pages.

"Final Office Action", U.S. Appl. No. 13/653,321, dated Aug. 2, 2013, 17 pages.

"Final Office Action", U.S. Appl. No. 13/653,682, dated Jun. 11, 2014, 11 pages.

"Final Office Action", U.S. Appl. No. 13/653,682, dated Oct. 18, 2013, 16 pages.

"Final Office Action", U.S. Appl. No. 13/656,055, dated Oct. 23, 2013, 14 pages.

"Final Office Action", U.S. Appl. No. 13/780,228, dated Mar. 28, 2014, 13 pages.

"Final Office Action", U.S. Appl. No. 13/852,848, dated Jul. 20, 2015, 9 pages.

(56) References Cited

OTHER PUBLICATIONS

"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, dated Oct. 24, 2013, 5 Pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"I-Blason Spring Series Premium Flexible KickStand Anti-Slippery TPU Cover Case For iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.
"I-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Preliminary Report on Patentability", Application No. PCT/US2014/031531, dated Jun. 9, 2015, 7 pages.
"International Search Report and Written Opinion", Application No. PCT/US2014/031531, dated Jun. 20, 2014, 10 Pages.
"International Search Report and Written Opinion", Application No. PCT/US2015/031271, dated Sep. 2, 2015, 10 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2013/042550, dated Sep. 24, 2013, 14 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 2012, 7 pages.
"MPC Fly Music Production Controller", AKAI Professional, Retrieved from: <http://www.akaiprompc.com/mpc-fly> on Jul. 9, 2012, 4 pages.
"New Friction Hinge for iPad Flip Stands", Retrieved From: http://www.nclosures.com/new-friction-hinge-design/, Jun. 18, 2013, 2 Pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/599,635, dated Feb. 25, 2014, 13 pages.
"Non-Final Office Action", U.S. Appl. No. 13/468,918, dated Dec. 26, 2013, 18 pages.
"Non-Final Office Action", U.S. Appl. No. 13/471,001, dated Feb. 19, 2013, 15 pages.
"Non-Final Office Action", U.S. Appl. No. 13/471,001, dated Jun. 17, 2014, 23 pages.
"Non-Final Office Action", U.S. Appl. No. 13/471,030, dated May 15, 2014, 10 pages.
"Non-Final Office Action", U.S. Appl. No. 13/471,054, dated Jun. 3, 2014, 15 pages.
"Non-Final Office Action", U.S. Appl. No. 13/471,139, dated Mar. 21, 2013, 12 pages.
"Non-Final Office Action", U.S. Appl. No. 13/471,186, dated Feb. 27, 2014, 8 pages.
"Non-Final Office Action", U.S. Appl. No. 13/471,202, dated Feb. 11, 2013, 10 pages.
"Non-Final Office Action", U.S. Appl. No. 13/471,237, dated Mar. 24, 2014, 7 pages.
"Non-Final Office Action", U.S. Appl. No. 13/471,336, dated Jan. 18, 2013, 14 pages.
"Non-Final Office Action", U.S. Appl. No. 13/471,336, dated May 7, 2014, 17 pages.
"Non-Final Office Action", U.S. Appl. No. 13/471,376, dated Apr. 2, 2014, 17 pages.
"Non-Final Office Action", U.S. Appl. No. 13/471,405, dated Feb. 20, 2014, 37 pages.
"Non-Final Office Action", U.S. Appl. No. 13/492,232, dated Apr. 30, 2014, 9 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Feb. 14, 2014, 5 pages.
"Non-Final Office Action", U.S. Appl. No. 13/564,520, dated Jun. 19, 2013, 8 pages.
"Non-Final Office Action", U.S. Appl. No. 13/564,520, dated Jun. 16, 2014, 5 pages.
"Non-Final Office Action", U.S. Appl. No. 13/565,124, dated Jun. 17, 2013, 5 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,232, dated Dec. 5, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/651,976, dated Jun. 16, 2014, 23 pages.
"Non-Final Office Action", U.S. Appl. No. 13/653,321, dated Feb. 1, 2013, 13 pages.

(56) References Cited

OTHER PUBLICATIONS

"Non-Final Office Action", U.S. Appl. No. 13/653,682, dated Feb. 7, 2013, 11 pages.
"Non-Final Office Action", U.S. Appl. No. 13/653,682, dated Feb. 26, 2014, 10 pages.
"Non-Final Office Action", U.S. Appl. No. 13/653,682, dated Jun. 3, 2013, 14 pages.
"Non-Final Office Action", U.S. Appl. No. 13/656,055, dated Mar. 12, 2014, 17 pages.
"Non-Final Office Action", U.S. Appl. No. 13/656,055, dated Apr. 23, 2013, 11 pages.
"Non-Final Office Action", U.S. Appl. No. 13/780,228, dated Sep. 18, 2015, 19 pages.
"Non-Final Office Action", U.S. Appl. No. 13/780,228, dated Oct. 30, 2013, 12 pages.
"Non-Final Office Action", U.S. Appl. No. 13/852,848, dated Mar. 26, 2015, 7 pages.
"Non-Final Office Action", U.S. Appl. No. 13/938,930, dated Aug. 29, 2013, 9 pages.
"Non-Final Office Action", U.S. Appl. No. 13/939,002, dated Aug. 28, 2013, 6 pages.
"Non-Final Office Action", U.S. Appl. No. 13/939,002, dated Dec. 20, 2013, 5 pages.
"Non-Final Office Action", U.S. Appl. No. 13/939,032, dated Aug. 29, 2013, 7 pages.
"Non-Final Office Action", U.S. Appl. No. 14/063,912, dated Jan. 2, 2014, 10 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/277,240, dated Jun. 13, 2014, 6 pages.
"Non-Final Office Action", U.S. Appl. No. 14/281,905, dated Jul. 10, 2015, 6 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,139, dated Mar. 17, 2014, 4 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.
"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.
"Notice of Allowance", U.S. Appl. No. 13/653,321, dated Dec. 18, 2013, 4 pages.
"Notice of Allowance", U.S. Appl. No. 13/852,848, dated Nov. 19, 2015, 4 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, dated Nov. 29, 2013, 6 pages.
"Restriction Requirement", U.S. Appl. No. 13/471,139, dated Jan. 17, 2013, 7 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.
"Supplementary European Search Report", EP Application No. 13728568.0, dated Oct. 30, 2015, 7 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"The New Lenovo Yoga Tablet 8", Retrieved From:<http://www.pricepanda.co.in/lenovo-yoga-tablet-8-pid1529091/> Jun. 11, 2014, 2014, 2 Pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.

(56) References Cited

OTHER PUBLICATIONS

Arar,"HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.
Chavan,"Synthesis, Design and Analysis of a Novel Variable Lift Cam Follower System", In Proceedings: International Journal of Design Engineering, vol. 3, Issue 4, Inderscience Publishers, Jun. 3, 2010, 1 Page.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Justin,"Seidio Active with Kickstand for the Galaxy SIII", Retrieved From: <http://www.t3chniq.com/seidio-active-with-kickstand-gs3/> on Nov. 22, 2013, Jan. 3, 2013, 5 Pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kraus,"HumanToolz Mobile Stand: A new iPad kickstand on Kickstarter", Retrieved From: www.technologytell.com/apple/100699/humantoolz-mobile-stand-a-new-ipad-kickstand-on-kickstarter, Jul. 31, 2012, 9 Pages.
Lahr,"Development of a Novel Cam-based Infinitely Variable Transmission", Proceedings: In Thesis of Master of Science in Mechanical Engineering, Virginia Polytechnic Institute and State University, Nov. 6, 2009, 91 pages.
Lambert,"Cam Design", In Proceedings: Kinematics and dynamics of Machine, University of Waterloo Department of Mechanical Engineering, Jul. 2, 2002, pp. 51-60.
Lee,"LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
Park,"Hinge Mechanism with Multiple Preset", U.S. Appl. No. 14/502,867, filed Sep. 30, 2014., 71 pages.
Post,"E-Broidery: Design and Fabrication of Textile-Based Computing", IBM Systems Journal, vol. 39, Issue 3 & 4, Jul. 2000, pp. 840-860.
Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher,"Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Sanap,"Design and Analysis of Globoidal Cam Index Drive", Proceedings: In International Journal of Scientific Research Engineering & Technology, Jun. 2013, 6 Pages.
Siddiqui,"Hinge Mechanism for Rotatable Component Attachment", U.S. Appl. No. 13/852,848, filed Mar. 28, 2013, 51 pages.
Siddiqui,"Multistage Friction Hinge", U.S. Appl. No. 14/755,734, filed Jun. 30, 2015, 50 pages.
Smith,"Quirky Cloak iPad Case Review", Retrieved From: http://notebooks.com/2011/02/03/quirky-cloak-ipad-case-review/, Feb. 3, 2011, 5 Pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Takamatsu,"Flexible Fabric Keyboard with Conductive Polymer-Coated Fibers", In Proceedings of Sensors 2011, Oct. 28, 2011, 4 pages.
Thurrott,"Surface Pro 3: Continuous Kickstand", Retrieved From: <http://winsupersite.com/mobile-devices/surface-pro-3-continuous-kickstand> Jun. 11, 2014, May 21, 2014, 5 Pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Williams,"A Fourth Generation of LCD Backlight Technology", Retrieved from <http://cds.linear.com/docs/Application%20Note/an65f.pdf>, Nov. 1995, 124 pages.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
"International Search Report and Written Opinion", Application No. PCT/US2016/037472, dated Sep. 2, 2016, 11 pages.
"Corrected Notice of Allowance", U.S. Appl. No. 14/502,867, dated May 26, 2016, 2 pages.
"Corrected Notice of Allowance", U.S. Appl. No. 14/502,867, dated Aug. 8, 2016, 2 pages.
"Foreign Office Action", EP Application No. 14720018.2, dated Mar. 7, 2017, 7 pages.
"International Preliminary Report on Patentability", Application No. PCT/US2015/052757, dated Sep. 5, 2016, 7 pages.
"International Search Report and Written Opinion", Application No. PCT/US2015/052757, dated Dec. 4, 2015, 12 pages.
"International Search Report and Written Opinion", Application No. PCT/US2017/024652, dated Jul. 10, 2017, 14 pages.

(56) References Cited

OTHER PUBLICATIONS

"Notice of Allowance", U.S. Appl. No. 14/502,867, dated May 16, 2016, 14 pages.
"Restriction Requirement", U.S. Appl. No. 14/502,867, dated Feb. 16, 2016, 7 pages.
"International Preliminary Report on Patentability Issued in PCT Application No. PCT/US2016/037472", Dated: Aug. 23, 2017, 6 Pages.

* cited by examiner

MULTISTAGE FRICTION HINGE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A multistage friction hinge is described. In at least some embodiments, the described hinge enables a support component to be adjustably attached to an apparatus. According to various embodiments, a hinge includes different activity stages where movement of the hinge is based on different activity mechanisms. For instance, the hinge includes different sets of components that form different friction engines that provide resistance to rotational and/or pivoting movement of the hinge.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A multistage friction hinge is described. In at least some implementations, the described hinge enables a support component to be adjustably attached to an apparatus, such as a computing device. For example, the hinge can be employed to rotatably attach a kickstand to a mobile computing device. The kickstand can be rotated via the hinge to various positions to provide support for different orientations of the computing device. This example is not intended to be limiting, however, and the described implementations can be used for hingeable attachment of a wide variety of different components to a wide variety of different apparatus.

According to various implementations, a hinge includes different activity stages where movement of the hinge is based on different activity mechanisms. For instance, the hinge includes different sets of components that form different friction engines and/or friction assemblies that provide resistance to rotational and/or pivoting movement of the hinge. Generally, a "friction engine" and/or "friction assembly" refers to a set of components that interact to generate frictional force, and thus resistance to movement. Accordingly, hinges described herein provide users with a variety of different angles for component attachment to support a variety of different usage scenarios. Various attributes and components of example hinge mechanisms are presented in detail below.

In the following discussion, an example environment is first described that may employ the techniques described herein. Embodiments discussed herein are not limited to the example environment, and the example environment is not limited to embodiments discussed herein. Next, example device orientations are discussed in accordance with one or more embodiments. Following this, example hinges for support component attachment are discussed in accordance with one or more embodiments. Finally, an example system is discussed that may implement various techniques described herein.

Example Environment

Figure 1:
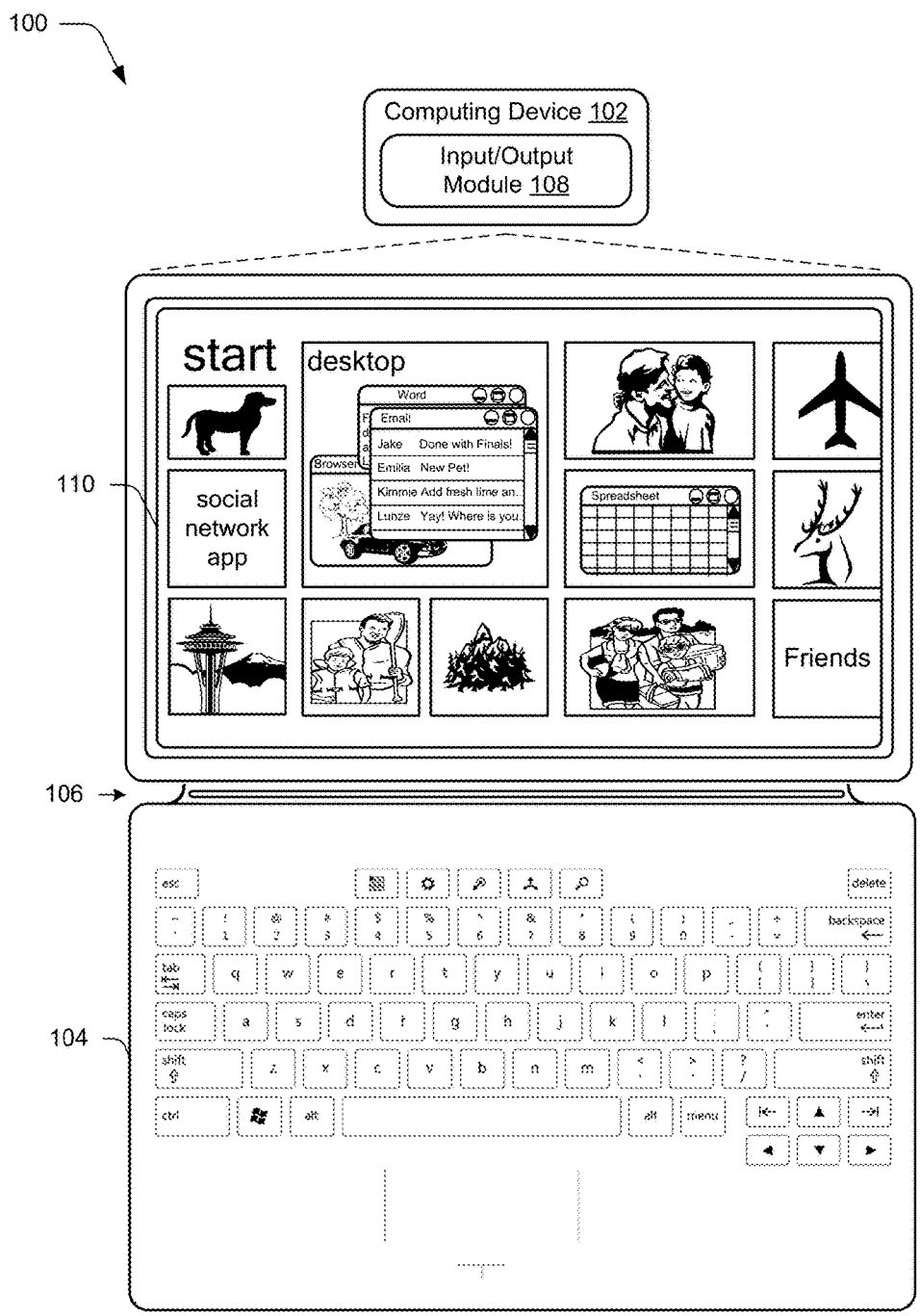
FIG. 1 is an illustration of an environment in an example implementation that is operable to employ the techniques described herein in accordance with one or more embodiments.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the computing device 102 may range from full resource devices with substantial memory and processor resources, to a low-resource device with limited memory and/or processing resources. An example implementation of the computing device 102 is discussed below with reference to FIG. 23.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

Example Device Orientations

Figure 2:
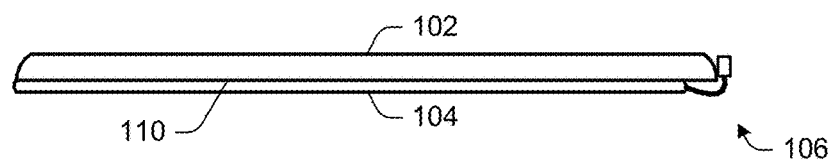
FIG. 2 illustrates an example orientation of an input device in relation to a computing device as covering a display device of the computing device in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
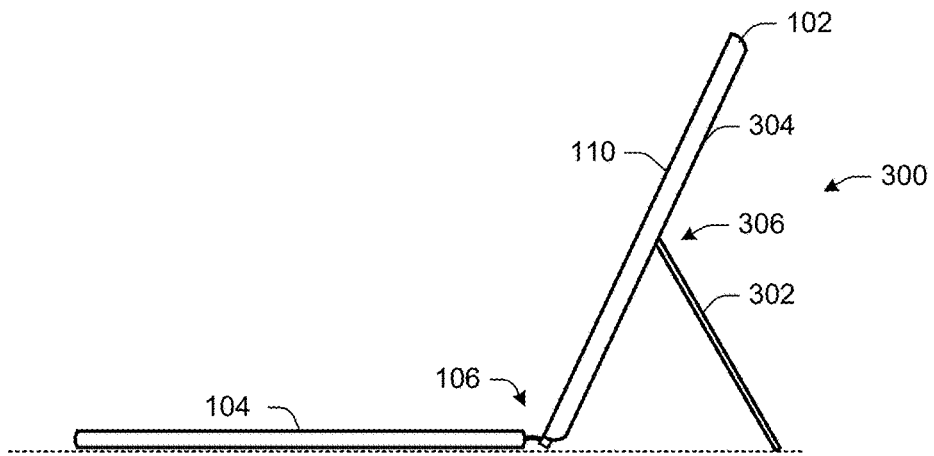
FIG. 3 illustrates an example orientation of an input device in relation to a computing device as assuming a typing orientation in accordance with one or more embodiments.

FIG. 3 depicts the computing device 102 in a position 300. In the position 300, the input device 104 is laid flat against a surface and the computing device 102 is disposed at an angle to permit viewing of the display device 110, e.g., such as through use of a kickstand 302 disposed on a rear surface 304 of the computing device 102. According to various implementations, the kickstand 302 can be employed as a support component to enable a variety of different orientations for the computing device 102, some of which are described herein. Naturally, a variety of other orientations other than those expressly illustrated and discussed herein are also supported.

The position 300 enables a variety of different usage scenarios, such as by allowing the display device 110 to be viewed and input to be provided to the computing device 102 via the input device 104. Alternatively or additionally, the position 300 enables a user to interact with a touchscreen of the display device 110.

According to various implementations, the kickstand 302 is rotatably and/or pivotably attached to the rear surface 304 of the computing device along a seam 306 via one or more hinges. Examples of suitable hinges are detailed below and in the accompanying drawings.

Figure 4:
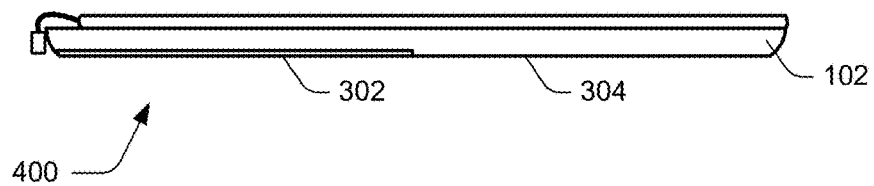
FIG. 4 illustrates an example orientation of a computing device with a support component in accordance with one or more embodiments.

FIG. 4 illustrates a position 400 which represents the kickstand 302 in a closed position. In the closed position, the kickstand 302 forms a portion of the rear surface 304 of the computing device 102 such that the kickstand 302 conforms to a surface contour of the computing device 102. For instance, when the kickstand 302 is in the closed position, the kickstand 302 integrates into the computing device 102 and does not protrude from a plane formed by the rear surface 304.

Figure 5:
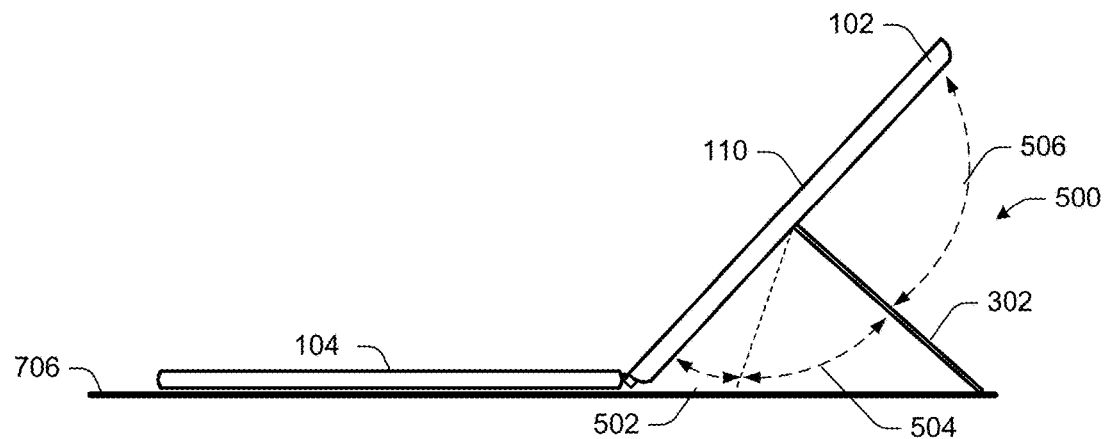
FIG. 5 illustrates an example orientation of a computing device with a support component in accordance with one or more embodiments.

FIG. 5 depicts the kickstand 302 in a position 500. The kickstand 302, for instance, is further opened past the position 300 discussed above to assume the position 500. FIG. 5 further depicts different angle ranges that exhibit different movement profiles for the kickstand 302. For instance, the kickstand 302 includes a closing angle range ("closing range") 502, a first friction angle range ("first friction range") 504, and a second friction angle range ("second friction range") 506. Generally, the different angle ranges represent different angles of the kickstand 302 from a closed position against the rear surface 304 of the computing device 102, e.g., from the position 400.

The closing range 502 represents a range of angles at which the kickstand 302 will tend to return to a closed position. For instance, as illustrated in a subsequent figure, the kickstand 302 includes a magnet along its peripheral edge that holds the kickstand 302 in a closed position based on magnetic attraction between the magnet and a ferromagnetic material on the rear surface 304 of the computing device 102. In at least some implementations, if a user opens and releases the kickstand 302 at an angle within the closing range 502, magnetic attraction and/or gravitational force will cause the kickstand 302 to rotate to a closed position relative to the computing device 102. In at least some implementations, the closing range 502 represents a range of zero degrees to thirty degrees, plus/minus ten degrees (0°-30°, +/−10°) from a closed position for the kickstand 302.

The first friction range 504 represents a range of angles at which the kickstand 302 exhibits a particular torque response. For instance, if a user opens the kickstand 302 past the closing range 502 to an angle within the first friction range 504 and releases the kickstand 302, the kickstand 302 will remain in the position in which it is released absent further force applied to move the kickstand 302. A hinge that attaches the kickstand 302 to the computing device 102, for example, prevents the kickstand 302 from moving from the position at which the kickstand 302 is released unless sufficient force is applied to the kickstand 302. Gravitational force alone and/or the weight of the computing device 102, for example, will not displace the kickstand 302 from the position at which it is released. In at least some implementations, the first friction range 504 represents a range of thirty one degrees to ninety degrees, plus/minus 10 degrees (31°-90°, +/−10°) from a closed position for the kickstand 302.

The second friction range 506 represents a range of angles at which the kickstand 302 exhibits a different torque response than for the first friction range 504. For instance, if a user opens the kickstand 302 past the first friction range 504 to an angle within the second friction range 506 and releases the kickstand 302, the kickstand 302 will remain in the position in which it is released absent further force applied to move the kickstand 302. A hinge that attaches the kickstand 302 to the computing device 102, for example, prevents the kickstand 302 from moving from the position at which the kickstand 302 is released unless sufficient force is applied to the kickstand 302. Gravitational force alone and/or the weight of the computing device 102, for example, will not displace the kickstand 302 from the position at which it is released. In at least some implementations, the second friction range 506 represents a range of ninety one degrees to one-hundred eighty degrees, plus/minus 10 degrees (91°-180°, +/−10°) from a closed position for the kickstand 302.

According to various implementations, resistance to movement (e.g., torque response) of the kickstand 302 is greater in the second friction range 506 than in the first friction range 504. For instance, when a user opens the kickstand 302 past the first friction range 504 to the second friction range 506, torque resistance to movement of the kickstand 302 increases. Transitioning from the first friction range 504 to the second friction range 506, for example, causes a transition in a torque profile for the kickstand 302. As detailed below, this variation in torque response for the kickstand 302 is based on a variable torque profile for a hinge that attaches the kickstand 302 to the computing device 102.

In at least some implementations, the position 500 for the kickstand 302 represents a maximum position for the kickstand 302 within the first friction range 504. For instance, opening the kickstand 302 further from the position 500 causes a transition from the first friction range 504 to the second friction range 506. In at least some implementations, the position 500 represents an angle of ninety degrees plus/minus ten degrees (90°, +/−10°) from a closed position for the kickstand 302.

Figure 6:
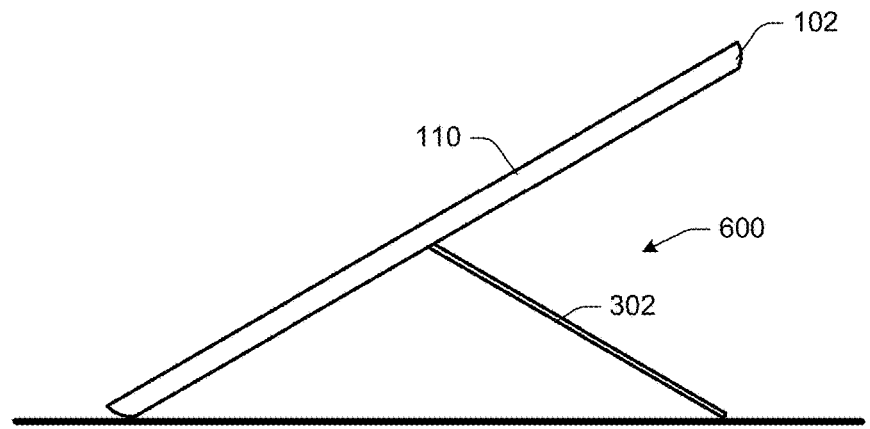
FIG. 6 illustrates an example orientation of a computing device with a support component in accordance with one or more embodiments.

FIG. 6 illustrates that the kickstand 302 can be rotated further past the position 500 to a position 600. The position 600, for instance, represents a position within the second friction range 506, discussed above. Generally, the kickstand 302 is held in the position 600 via a friction mechanism, examples of which are detailed below. In the position 600, the computing device 102 is reclined in comparison to previously-discussed orientations, such as the position 500. As illustrated, the position 600 presents the display device 110 at a more open angle that supports different usage scenarios. For instance, the position 600 supports use of the computing device 102 in a user's lap, such as during air travel. A variety of other usage scenarios are supported by the position 600, such as for tall users that may have a higher viewing angle, use on a low surface (e.g., a coffee table), and so forth. FIG. 6 also depicts that the input device 104 is detached from the computing device 102. As discussed above, the input device 104 is removably attached to the computing device 104 to support a variety of different usage scenarios.

Figure 7:
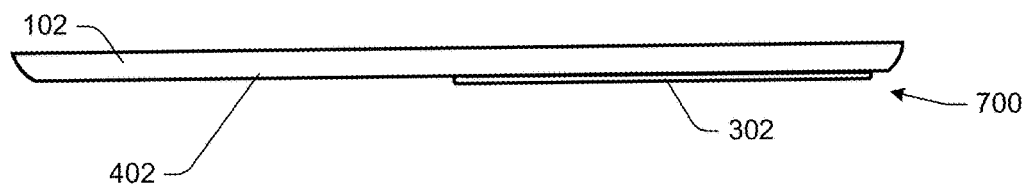
FIG. 7 illustrates an example orientation of a computing device with a support component in accordance with one or more embodiments.

FIG. 7 illustrates that the kickstand 302 can be rotated further away from the rear surface 402 of the computing device 102 to a position 700. For instance, the kickstand 302 can be rotated further past the position 600 to the position 700.

In at least some implementations, the position 700 represents maximum open position for the kickstand 302. The position 700, for instance, represents a one hundred and eighty degree (180°) rotation of the kickstand 302 from a closed position. For example, in the position 700, the kickstand 302 rests against the rear surface 304 of the computing device 102 opposite the closed position 400 depicted in FIG. 4.

Figure 8:
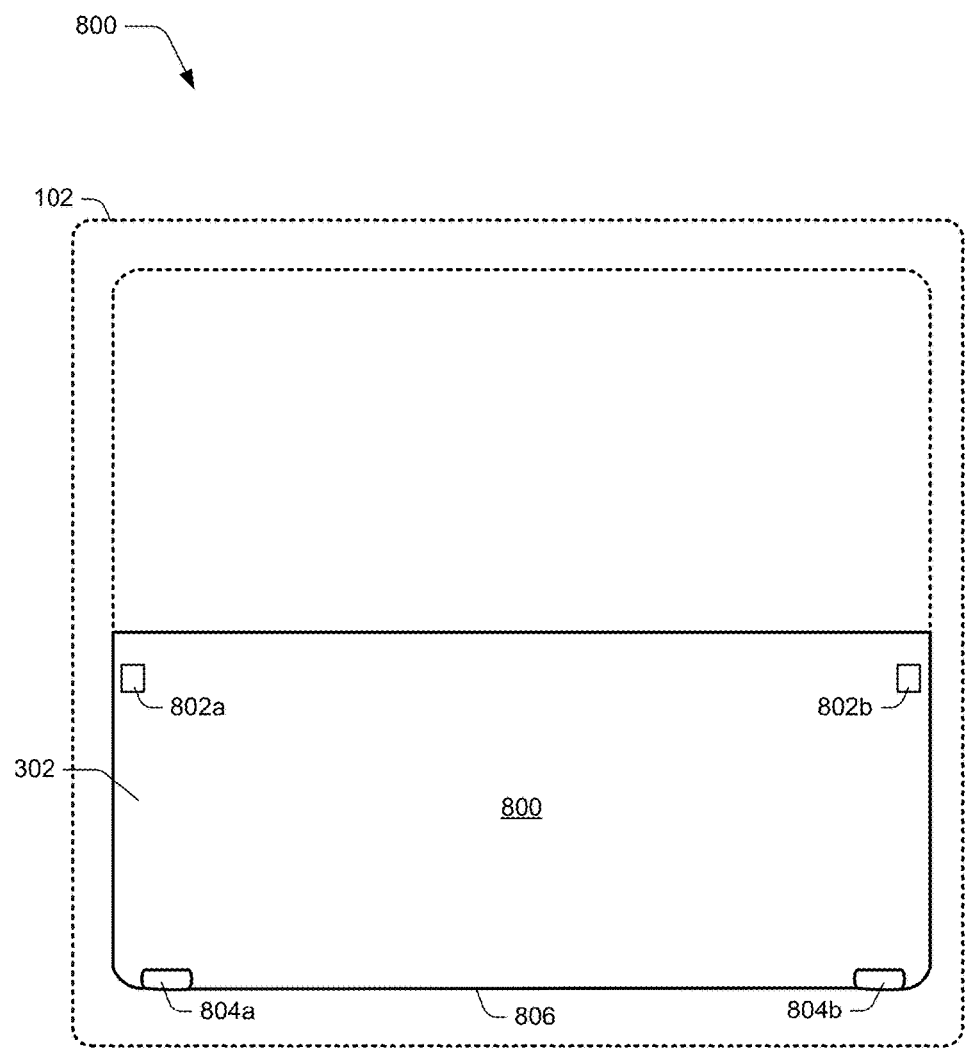
FIG. 8 illustrates an example inner surface of a support component in accordance with one or more embodiments.

FIG. 8 illustrates a view of an inner surface 800 of the kickstand 302 in accordance with one or more embodiments. In this example, the kickstand 302 is illustrated in the context of an outline of a chassis of the computing device 102. The inner surface 800 includes hinge mounts 802a, 802b, which function as mounting points for hinge mechanisms that are employed to attach the kickstand 302 to the computing device 102. Examples of such hinge mechanisms are discussed below.

The inner surface 800 further includes magnets 804a, 804b along a lower peripheral edge 806 of the kickstand 302. According to various implementations, the magnets 804a, 804b hold the kickstand 302 in a closed position and resist opening of the kickstand 302. Further, magnetic attraction between the magnets 804a, 804b and paramagnetic material on the rear surface 304 of the computing device 102 tends to pull the kickstand 302 into a closed position. For instance, if the kickstand 302 is released at an open position within the closing range 502, gravitational force and magnetic attraction between the magnets 804a, 804b and paramagnetic material on the rear surface 304 of the computing 102 will cause the kickstand 302 to snap into a closed position.

Hinges for Component Attachment

A variety of different hinge mechanisms can be employed for attaching various components in accordance with various embodiments. Some example hinge mechanisms and hinge arrangements are discussed below.

Figure 9:
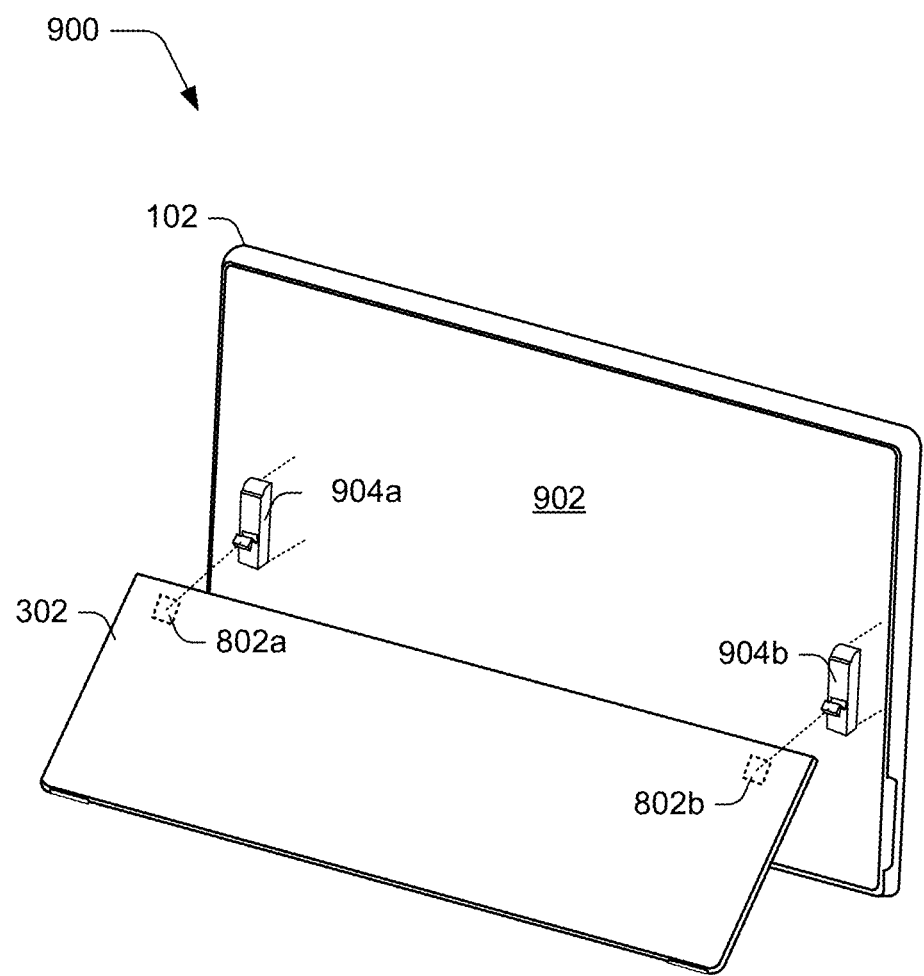
FIG. 9 illustrates an example exploded view of a computing device with a support component in accordance with one or more embodiments.

FIG. 9 illustrates an exploded rear view 900 of a chassis 902 of the computing device 102 and the kickstand 302. Included in the rear view 900 are hinges 904a and 904b, which are employed to attach the kickstand 302 to the computing device 102. In at least some implementations, the hinges 904a, 904b are installed internally in the computing device 102, such as via a suitable attachment method and/or device.

The kickstand 302 can be attached to a pivoting portion of the hinges 904a, 904b via the hinge mounts 802a, 802b. Thus, attachment to the hinges 904a, 904b enables the kickstand 302 to pivot between various positions relative to the computing device 102.

Figure 10:
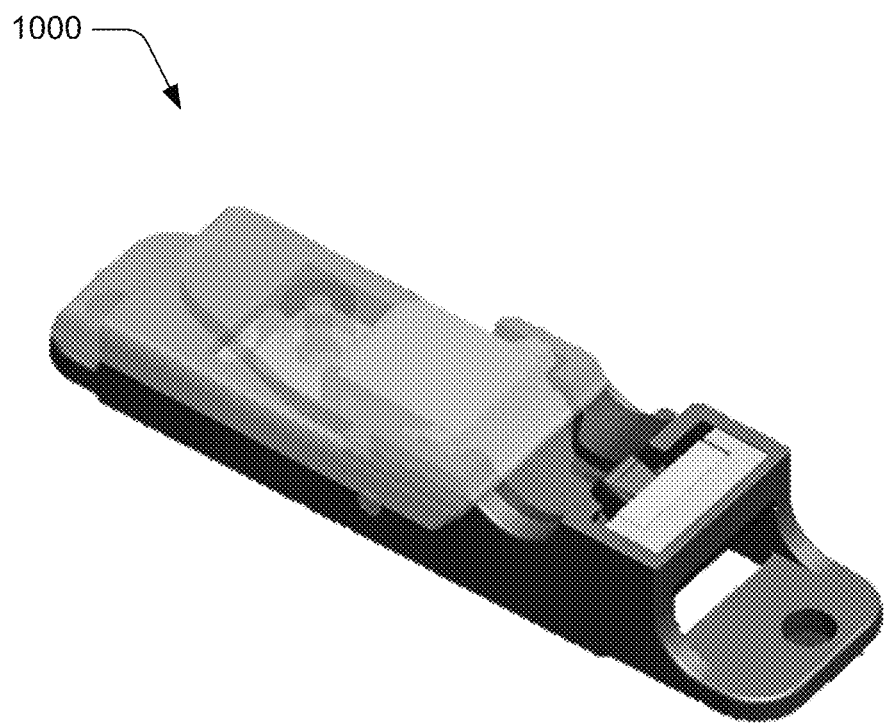
FIG. 10 depicts an isometric view of an example hinge in accordance with one or more embodiments.

FIG. 10 depicts an isometric view of an example hinge 1000 in accordance with one or more embodiments. The hinge 1000, for instance, represents an implementation of the hinges 904a, 904b discussed above. This is not intended to be limiting, however, and the hinge 1000 can be employed as a hinge for a variety of different components and in a variety of different attachment scenarios. The hinge 1000 and its various components can be formed using any suitable material and/or combination of materials, such as metals, plastics, polymers, alloys, and so forth. Generally, the view depicted in FIG. 10 represents the hinge 1000 in a closed position, such as the position 400 depicted in FIG. 4. FIGS. 11a-11g now detail some example components of the hinge 1000.

Figure 11A:
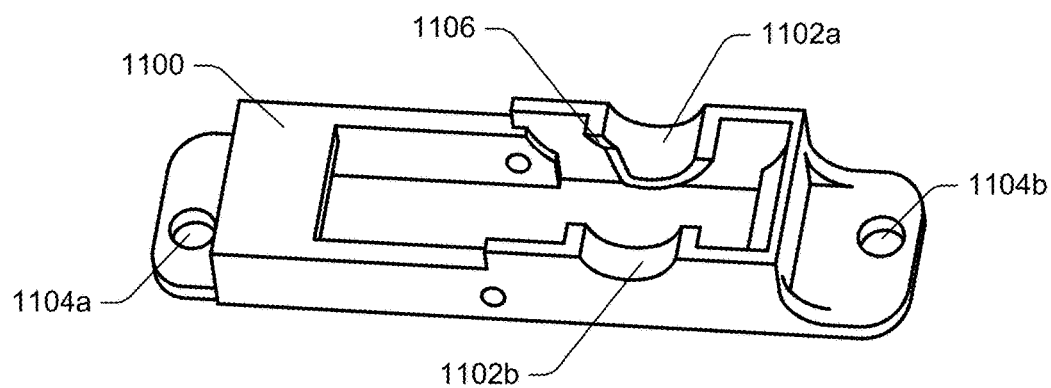
FIG. 11a depicts an isometric view of a hinge frame in accordance with one or more embodiments.

FIG. 11a depicts an isometric view of a hinge frame 1100 in which and/or to which various other components of the hinge 1000 can be disposed and/or attached. For example, the hinge frame 1100 can be mounted to and/or within a device (e.g., the computing device 102) and function as a support structure for other components of the hinge 1000.

The hinge frame 1100 includes ring guides 1102a, 1102b and mounting holes 1104a, 1104b. As further detailed below, the ring guides 1102a, 1102b represent protrusions on the inner surface of the hinge frame 1100 that serve as guiding surfaces for guiding movement of one or more components of the hinge 1000. The mounting holes 1104a, 1104b represents apertures through which a fastening device can be placed to attach the hinge 1000 to an apparatus, such as the computing device 102.

Notice that the ring guide 1102a includes a tab notch 1106. Generally, the tab notch 1106 represents an indentation in the surface profile of the ring guide 1102a. As further detailed below, the tab notch 1106 assists in enabling the hinge 1000 to transition between different friction profiles.

Figure 11B:
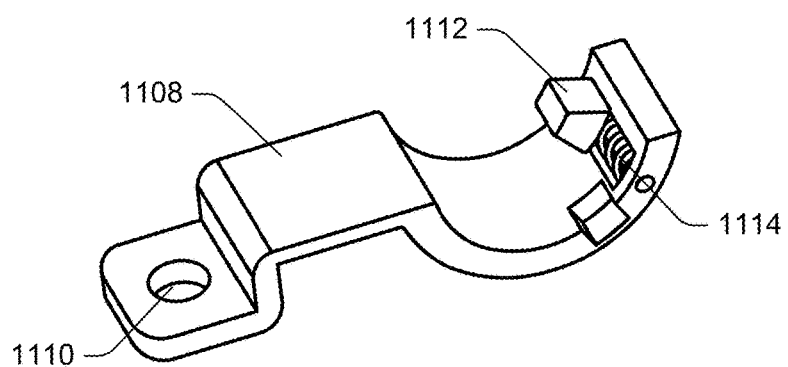
FIG. 11b depicts an isometric view of a cam in accordance with one or more embodiments.

FIG. 11b depicts an isometric view of a cam 1108. As further detailed below, the cam 1108 is positioned at least partially within the hinge frame 1100. The cam 1108 includes a mounting hole 1110, a lock tab 1112, and a tab spring 1114. The mounting hole 1110 represents an aperture through which a fastening device can be placed to attach the cam 1108 to a moveable component, such as the kickstand 302. For instance, attachment of the kickstand 302 to the cam 1108 enables moveable attachment of the kickstand 302 to the computing device 102.

As further detailed below, the lock tab 1112 enables engagement and disengagement of different friction profiles for the hinge 1000. The tab spring 1114 applies biasing force against the lock tab 1112. Biasing force applied by the tab spring 1114, for instance, is perpendicular to a longitudinal axis of the cam 1108.

Figure 11C:
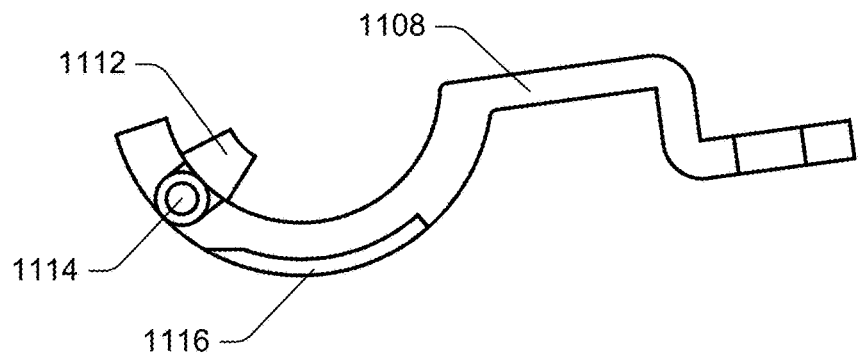
FIG. 11c depicts a side cross-section view of a cam in accordance with one or more embodiments.

FIG. 11c depicts a side cross-section view of the cam 1108 in accordance with one or more implementations. FIG. 11c includes the lock tab 1112 and the tab spring 1114, introduced above. Further depicted is a spring groove 1116 in a lower surface of the cam 1108. Further functional details of the spring groove 1116 are presented below.

Figure 11D:
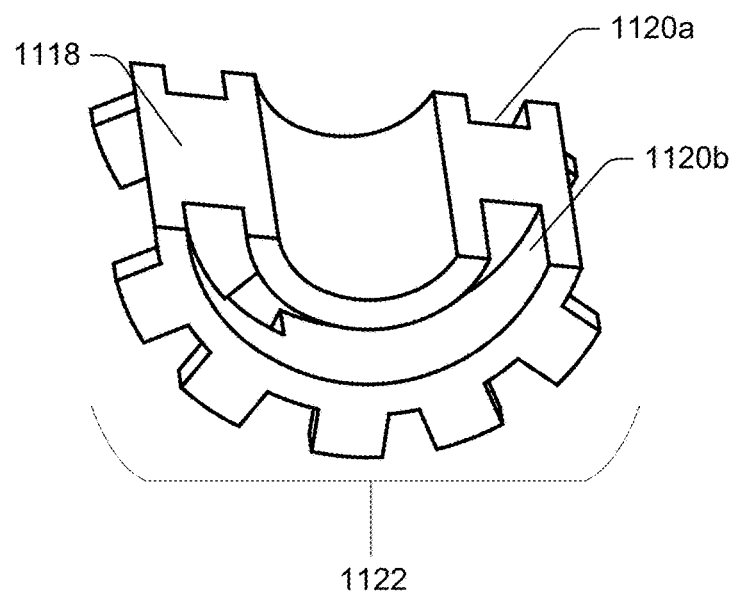
FIG. 11d depicts an isometric view of an upper hinge ring in accordance with one or more embodiments.

FIG. 11d depicts an isometric view of an upper hinge ring 1118 in accordance with one or more implementations. The upper hinge ring 1118 includes ring channels 1120a, 1120b and upper ring teeth 1122. According to various implementations, in an assembly of the hinge 1000 the ring guides 1102a, 1102b engage within respective instances of the ring channels 1120a, 1120b. Accordingly, engagement of the ring guides 1102a, 1102b with the ring channels 1120a, 1120b during movement of the upper hinge ring 1118 causes the upper hinge ring 1118 to rotate relative to the hinge frame 1100. The upper ring teeth 1122 enable engagement of the upper hinge ring 1118 with one or more other components of the hinge 1000, discussed in more detail below.

Figure 11E:
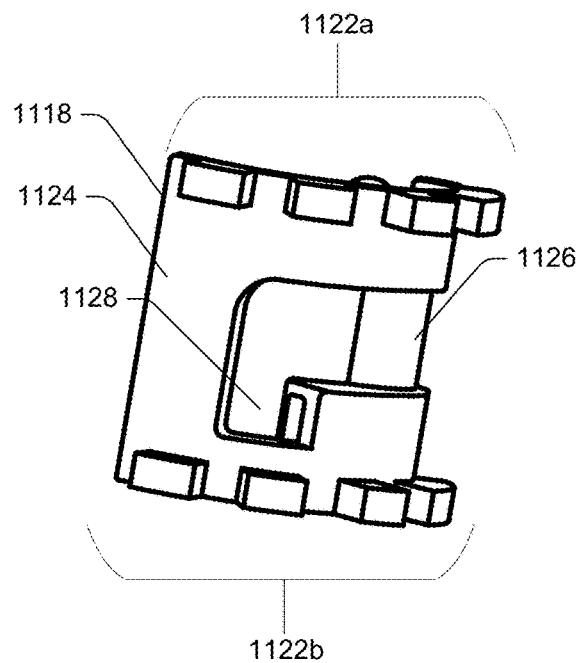
FIG. 11e depicts an isometric view of a lower surface of an upper hinge ring in accordance with one or more embodiments.

FIG. 11e depicts an isometric view of a lower surface 1124 of the upper hinge ring 1118 in accordance with one or more implementations. Positioned along the periphery of the lower surface 1124 are teeth sets 1122a, 1122b of the upper ring teeth 1122, introduced above. Formed within the lower surface 1124 is an upper ring groove 1126, which represents a recess within the lower surface 1124. The upper ring groove 1126 includes a tab catch 1128 at one end. As further detailed below, the lock tab 1112 on the cam 1108 engages with the tab catch 1128 in certain positions to enable movement of the upper hinge ring 1118 along with the cam 1108 in accordance with one or more implementations.

Figure 11F:
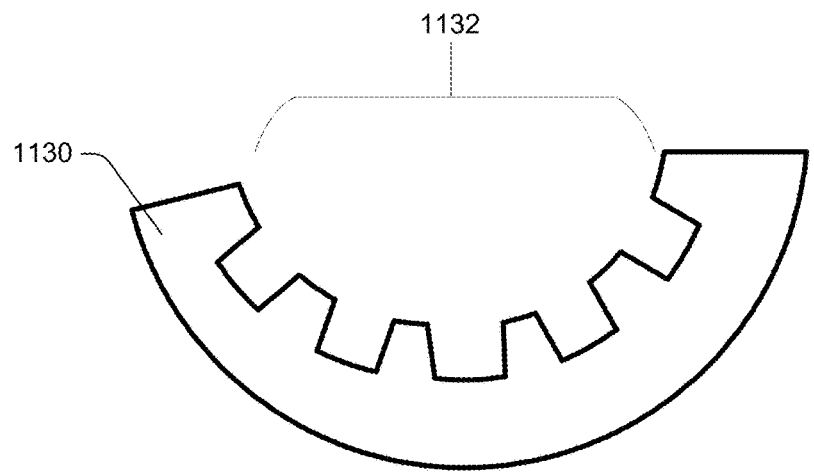
FIG. 11f depicts a side view of a lower hinge ring in accordance with one or more embodiments.

FIG. 11f depicts a side view of a lower hinge ring 1130 in accordance with one or more implementations. The lower hinge ring 1130 includes lower ring teeth 1132, which are positioned to engage with the upper ring teeth of the upper hinge ring 1118 in an assembly of the hinge 1000. According to various implementations, the lower hinge ring 1130 includes two sets of the lower ring teeth 1132 along opposite edges of the lower hinge ring 1130. Thus, respective sets of the lower ring teeth 1132 are positioned to engage with different respective sets of the upper ring teeth 1122 to enable the upper hinge ring 1118 and the lower hinge ring 1130 to form an integrated mechanism.

Figure 11G:
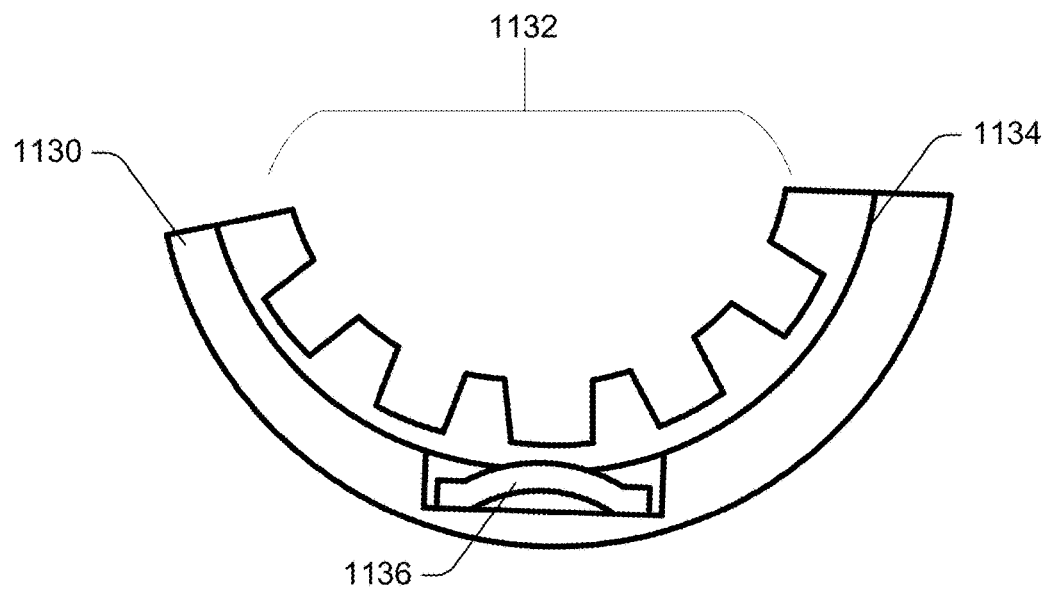
FIG. 11g depicts a side cross-section view of a lower hinge ring in accordance with one or more embodiments.

FIG. 11g depicts a side cross-section view of a lower hinge ring 1130 in accordance with one or more implementations. Further depicted are the lower ring teeth 1132 and an inner ring surface 1134. According to various implementations, the inner ring surface 1134 represents an inside surface of the lower hinge ring 1130 that separates peripheral sets of the lower ring teeth 1132. A lower ring spring 1136 is disposed within a recess in the inner ring surface 1134. The lower ring spring 1136, for instance, represents a leaf spring or other elastic object fastened within the recess in the inner ring surface 1134. As further detailed below, the lower ring spring 1136 is positioned to interface with the cam 1108 in one or more positions of the hinge 1000.

According to various implementations, the components introduced above along with other components of the hinge 1000 interact during movement of the hinge 1000 to provide a particular responsiveness profile over different hinge positions.

The following figures discuss different orientations of the hinge 1000, such as based on orientations of the kickstand 302 relative to the computing device 102. As discussed herein, "opening" of the kickstand 302 and/or the hinge 1000 refers to a movement of the kickstand 302 and/or the hinge 1000 away from a closed position (e.g., the position 400) toward an open position. Further, "closing" of the kickstand 302 and/or the hinge 1000 refers to a movement of the kickstand 302 and/or the hinge 1000 from an open position toward a closed position, e.g., toward the position 400.

Figure 12:
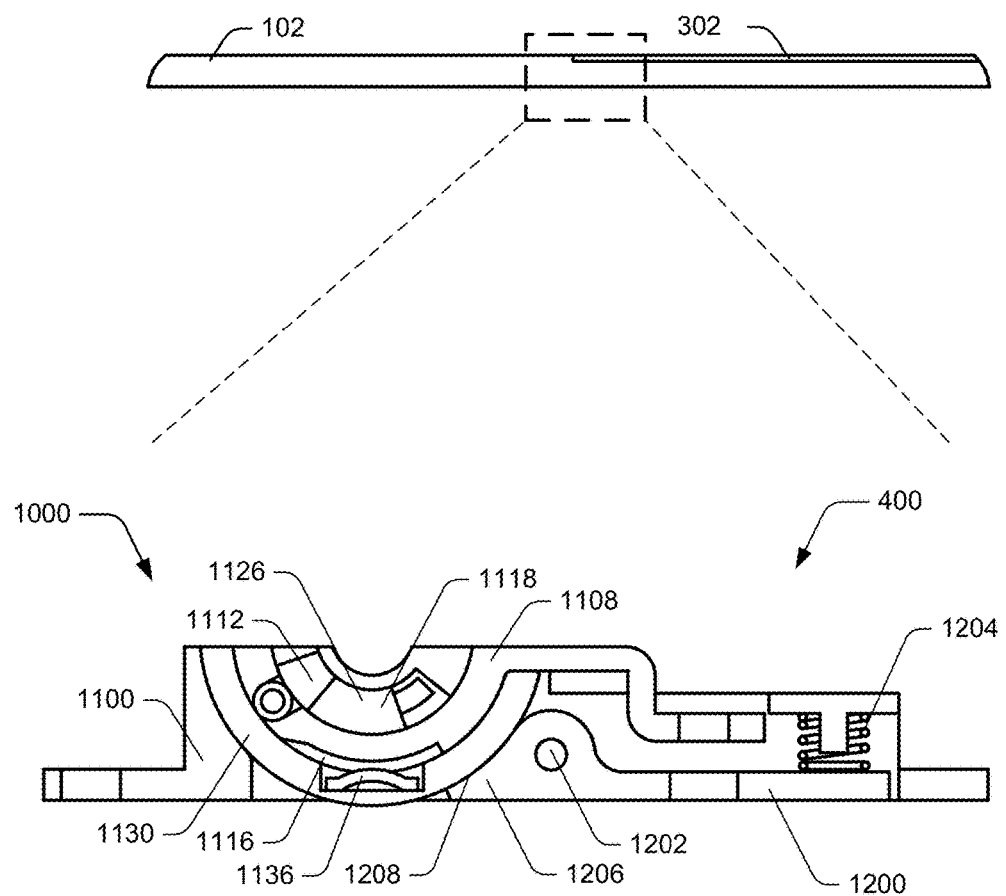
FIG. 12 depicts a side cross-section view of a hinge in accordance with one or more embodiments.

FIG. 12 depicts a side cross-section view of the hinge 1000 in accordance with one or more implementations. Generally, the view depicted in FIG. 12 represents the hinge 1000 in a closed position, such as the position 400 of the kickstand 302 relative to the computing device 102 depicted in FIG. 4. This side view illustrates the hinge frame 1100, the cam 1108, the upper hinge ring 1118, and the lower hinge ring 1130.

FIG. 12 further depicts a friction bar 1200 disposed on a pivot pin 1202, and a bar spring 1204. The bar spring 1204 is positioned within the hinge frame 1100 such that the bar spring 1204 applies spring force against one end of the friction bar 1200. At the opposite end of the friction bar 1200 is a contact interface 1206 positioned in contact with an outer surface 1208 of the lower hinge ring 1130. According to various implementations, spring force from the bar spring 1204 presses downward on the friction bar 1200, which causes the friction bar 1200 to pivot about the pivot pin 1202 such that the contact interface 1206 bears against the outer surface 1208 of the lower hinge ring 1130. Contact between the contact interface 1206 and the outer surface 1208 represents a friction interface between the friction bar 1200 and the lower hinge ring 1130 that results in a particular torque profile at certain positions of the hinge 1000.

Notice that in FIG. 12, the lower ring spring 1136 protrudes into the spring groove 1116 in the cam 1108. In the closed position, for example, the lower ring spring 1136 does not contact the cam 1108 and thus does not impede opening of the hinge 1000 from the closed position. As discussed above, the hinge 1000 may be held in the closed position based on other forces, such as magnetic attraction between the magnets 804a, 804b and a magnetically active material in the chassis 902 of the computing device 102. FIG. 12 further depicts that the lock tab 1112 of the cam 1108 is positioned within the upper ring groove 1126 of the upper hinge ring 1118.

Figure 13:
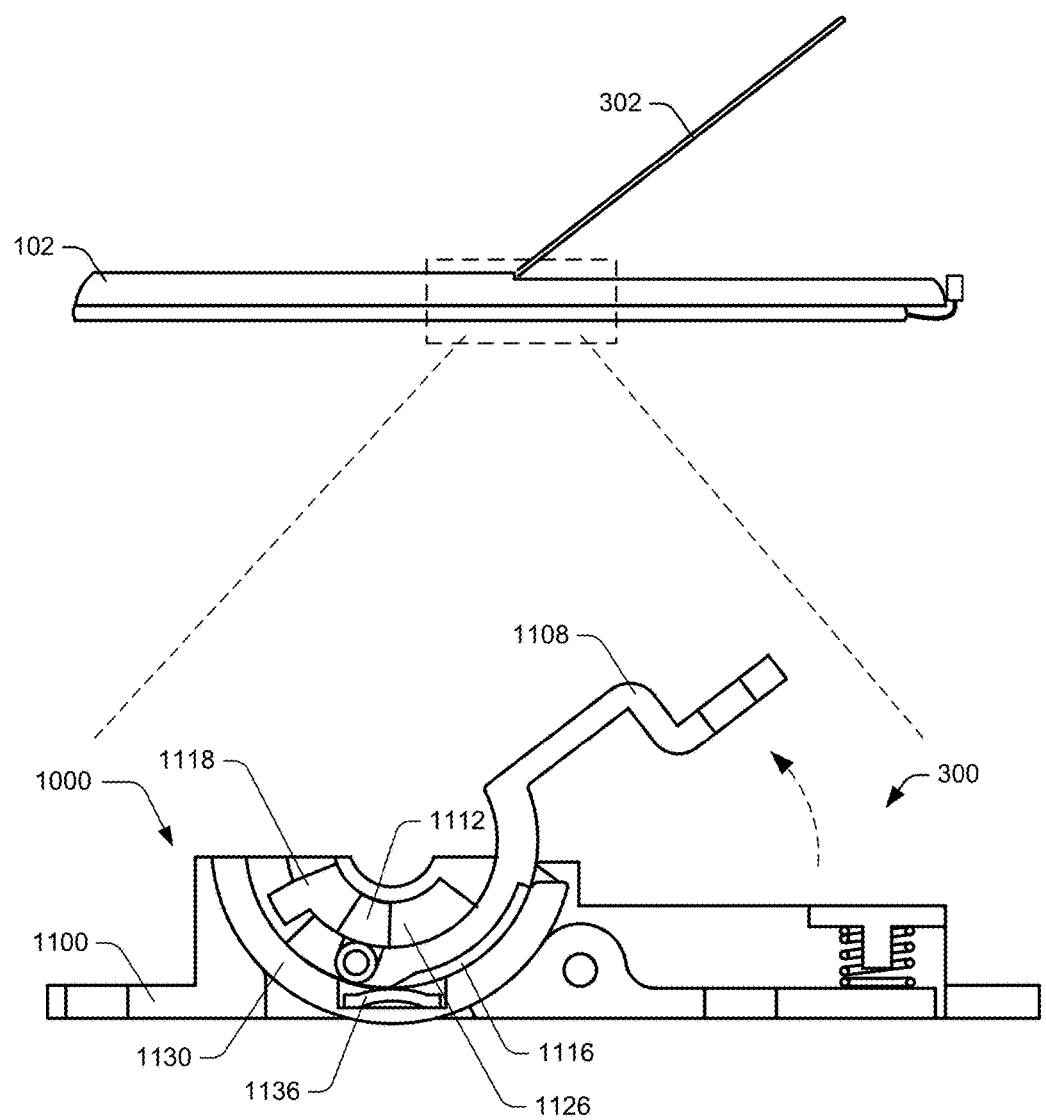
FIG. 13 depicts a side cross-section view of a hinge in accordance with one or more embodiments.

FIG. 13 depicts a side cross-section view of the hinge 1000 opened to the position 300 in accordance with one or more implementations. For instance, a user manipulates the kickstand 302 from a closed position relative to the computing device 102 to the position 300 introduced with reference to FIG. 3. This side view illustrates the hinge frame 1100, the cam 1108, the upper hinge ring 1118, and the lower hinge ring 1130.

FIG. 13 illustrates that opening the hinge 1000 to the position 300 causes the cam 1108 to engage with and compress the lower ring spring 1136. For instance, as the cam 1108 is initially moved from the closed position toward an open position, the depth of the spring groove 1116 is such that the cam 1108 does not contact the lower ring spring 1136. However, the spring groove 1116 is tapered such that when the cam 1108 reaches the position 300, the cam 1108 engages with and compresses the lower ring spring 1136. According to various implementations, the point at which the cam 1108 first engages with the lower ring spring 1136 represents a transition from the closing range 502 to the first friction range 504, introduced above. For instance, if the kickstand 302 is released at the position 300, friction caused by the interface between the lower ring spring 1136 and the cam 1108 will cause the hinge 1000 and thus the kickstand 302 to persist in the position 300. Thus, external force is required to disengage the hinge 1000 from the position 300.

Generally, interaction between the cam 1108 and the lower ring spring 1136 represents a friction engine and/or friction assembly that generates resistance to movement of the cam 1108 relative to the hinge frame 1100. Different components of the hinge 1000, for instance, represent different friction engines and/or friction assemblies that resist movement of the cam 1108 dependent on a particular angle of the cam 1108 relative to the hinge frame 1100.

According to various implementations, a depth profile of the spring groove 1116 can be altered to provide different torque response profiles. For instance, the spring groove 1116 can be generated with a gradually decreasing depth such that resistance to opening of the kickstand 302 gradually increases due to gradually increasing frictional force between the lower ring spring 1136 and the cam 1108. Alternatively, the spring groove 1116 can be generated with a sharply decreasing depth to increase a rate at which frictional forces between the lower ring spring 1136 and the cam 1108 increases.

FIG. 13 further depicts that as the hinge 1000 moves from the closed position to the position 300, the lock tab 1112 on the cam 1108 moves within the upper ring groove 1126 of the upper hinge ring 1118.

Figure 14:
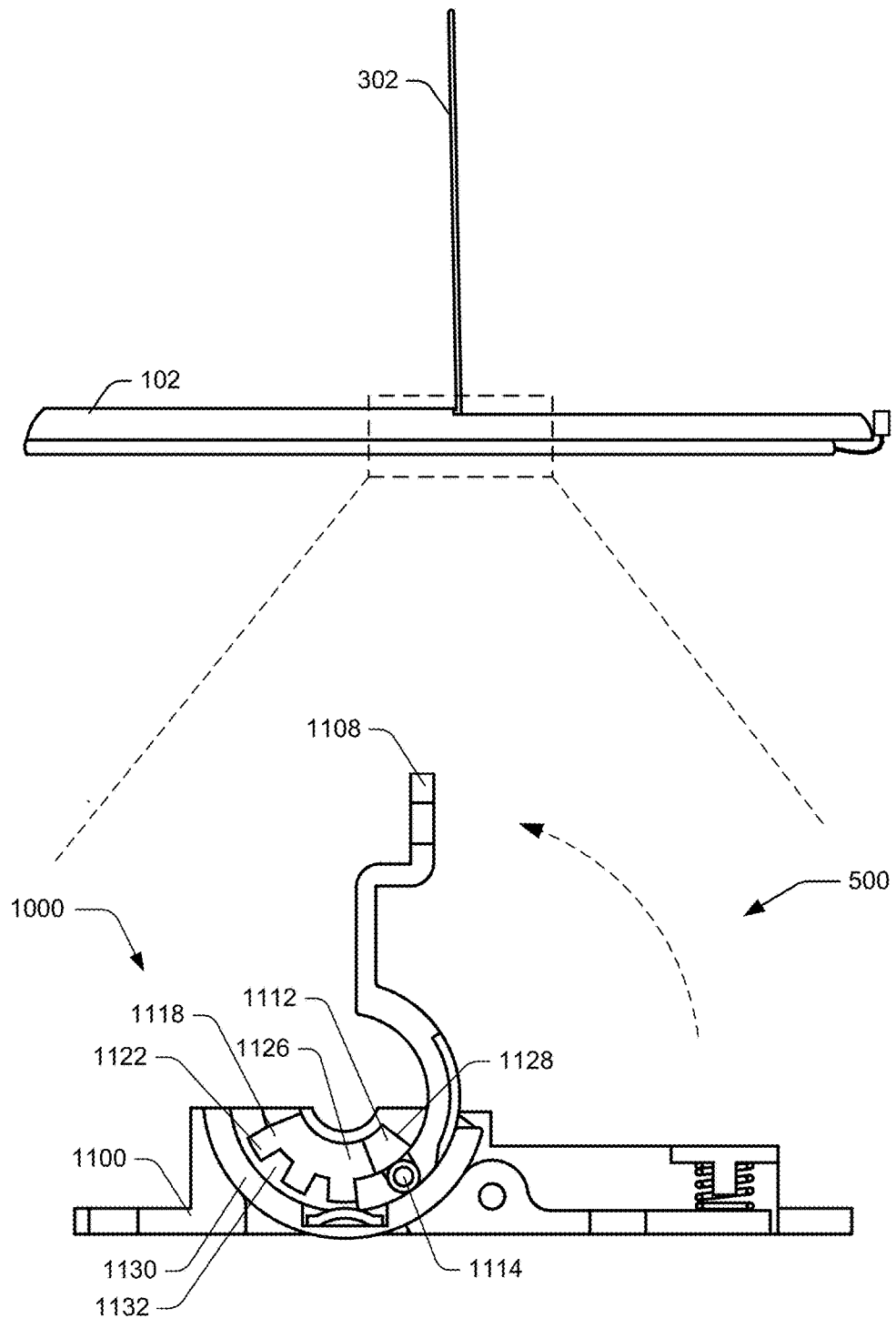
FIG. 14 depicts a side cross-section view of a hinge in accordance with one or more embodiments.

FIG. 14 depicts a side cross-section view of the hinge 1000 opened to the position 500 in accordance with one or more implementations. For instance, a user opens the kickstand 302 from the position 300 to the position 500 introduced with reference to FIG. 5. This side view illustrates the hinge frame 1100, the cam 1108, the upper hinge ring 1118, and the lower hinge ring 1130. The side view also illustrates that the upper ring teeth 1122 of the upper hinge ring 1118 engage with the lower ring teeth 1132 of the lower hinge ring 1130. Generally, engagement of the upper ring teeth 1122 and the lower ring teeth 1132 represents an interlocking mechanism that interlocks the upper hinge ring 1118 with the lower hinge ring 1130.

FIG. 14 further illustrates that at the position 500, the lock tab 1112 has reached an end of the upper ring groove 1126. Accordingly, biasing force from the tab spring 1114 causes the lock tab 1112 to slide into and engage with the tab catch 1128 at the end of the upper ring groove 1126 (introduced in FIG. 11e), which is more clearly illustrated in FIG. 15.

Figure 15:
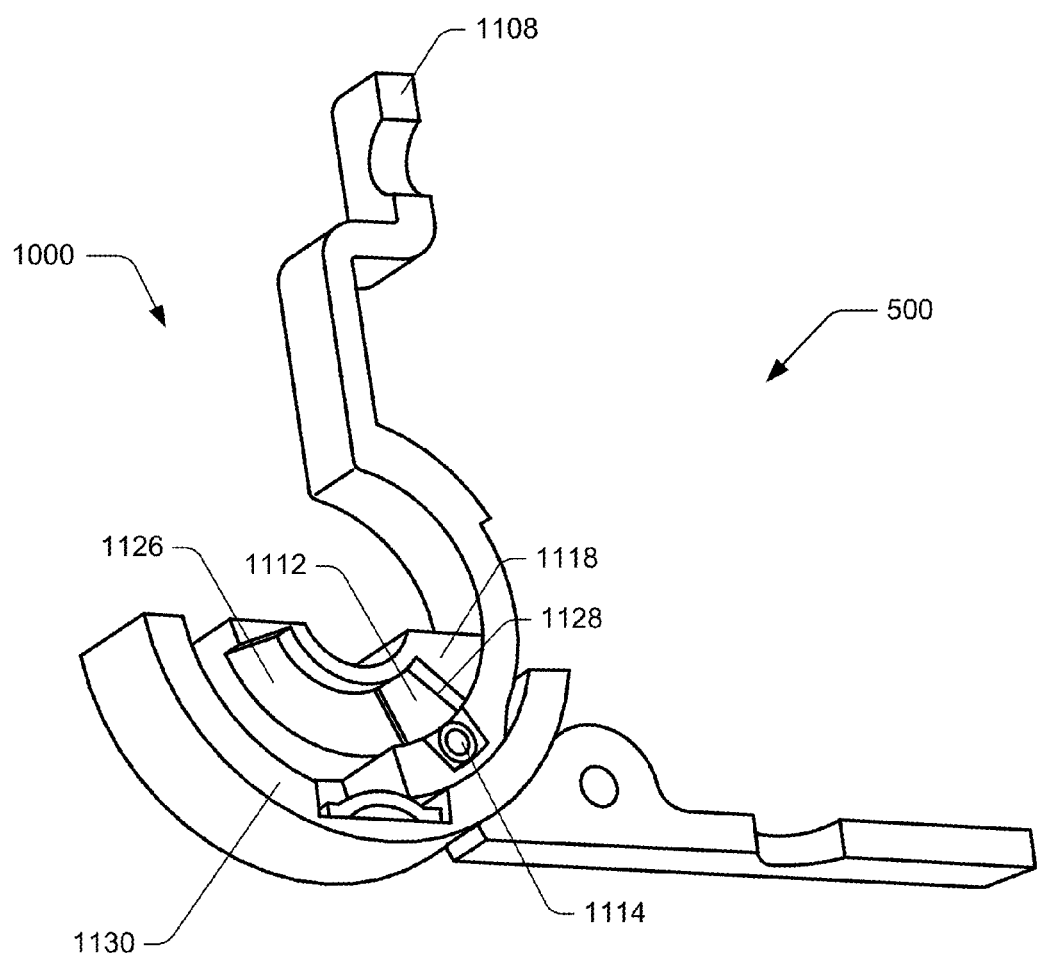
FIG. 15 depicts an isometric side cross-section view of various components of a hinge in accordance with one or more embodiments.

FIG. 15 depicts an isometric side cross-section view of various components of the hinge 1000 opened to the position 500 in accordance with one or more implementations. To aid in understanding, certain components of the hinge 1000 are omitted.

FIG. 15 illustrates that in the position 500, biasing force from the tab spring 1114 causes the lock tab 1112 to slide into and engage with the tab catch 1128 at the end of the upper ring groove 1126. As further discussed below, engagement of the lock tab 1112 with the tab catch 1128 enables movement of the cam 1108 to cause a corresponding movement of the upper hinge ring 1118 and the lower hinge ring 1130.

According to various implementations, the position 500 represents a transition from the first friction range 504 to the second friction range 506, introduced above. For instance, opening the hinge 1000 further past the position 500 causes a change in a torque profile for movement of the hinge 1000 according to the second friction range 506.

Figure 16:
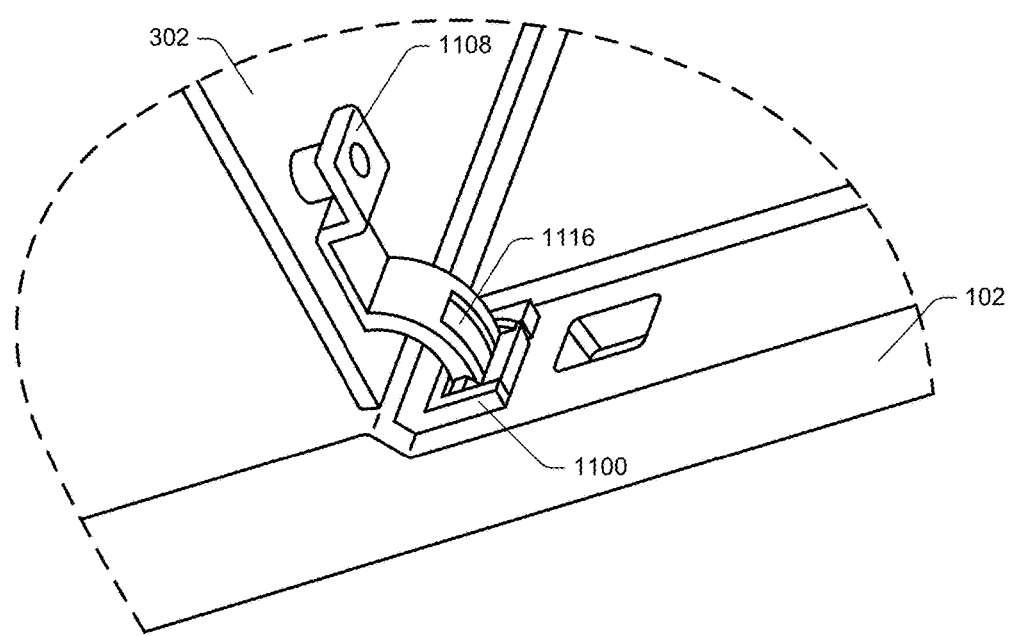
FIG. 16 depicts a partial side view of a computing device with a kickstand opened to a particular position in accordance with one or more embodiments.

FIG. 16 depicts a partial side view of the computing device 102 with the kickstand 302 opened to the position 500 in accordance with one or more implementations. This particular view shows the cam 1108 attached to the kickstand 302, with the spring groove 1116 in the lower surface of the cam 1108 visible. FIG. 16 further depicts that in the position 500, the upper hinge ring 1118 and the lower hinge ring 1130 remain positioned within the hinge frame 1100. As depicted in subsequent figures, further opening of the hinge 1000 past the position 500 causes the upper hinge ring 1118 and the lower hinge ring 1130 to partially pivot outside of the hinge frame 1100.

Figure 17:
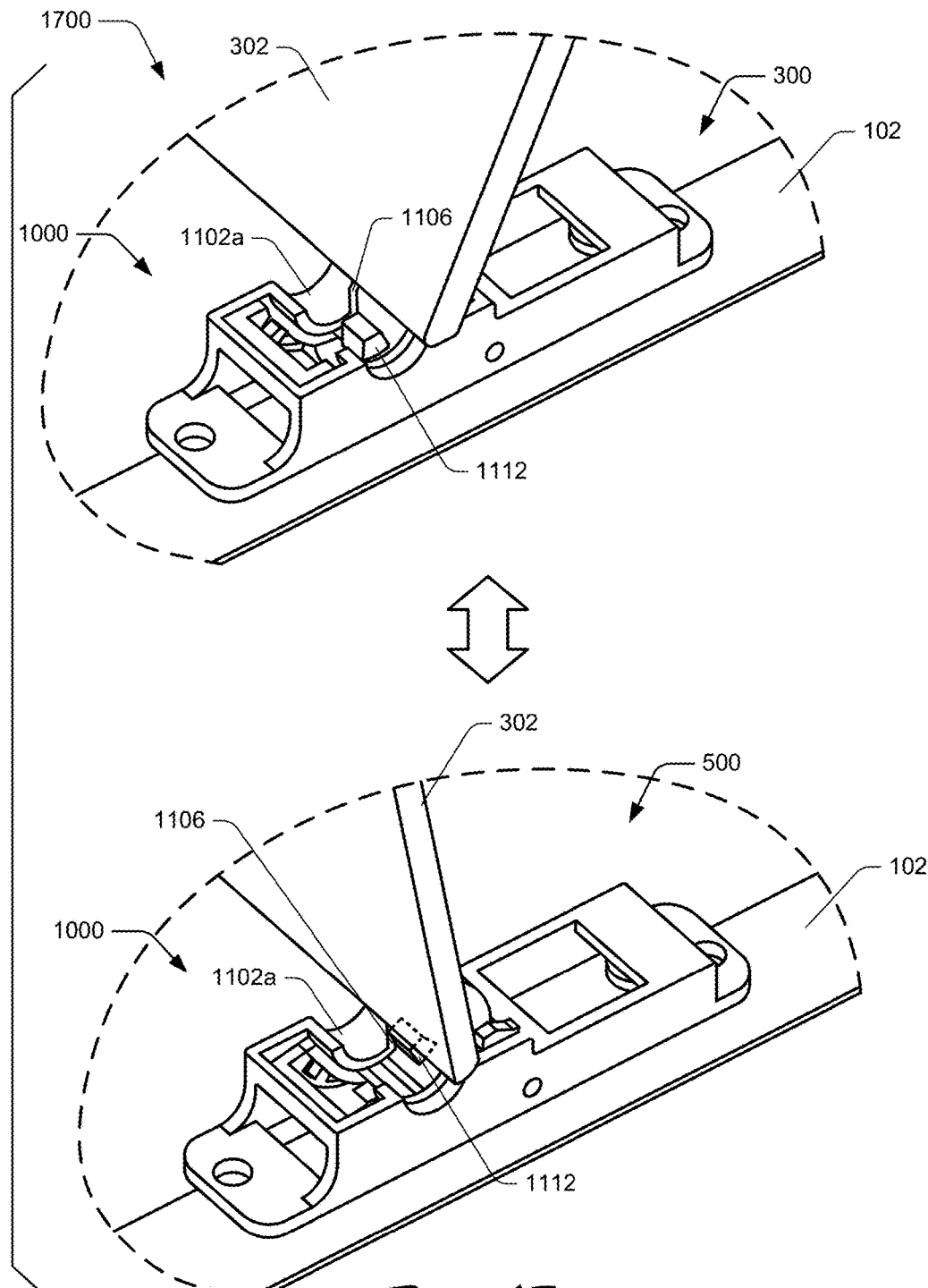
FIG. 17 depicts an example implementation scenario that illustrates movement of a kickstand and a hinge in accordance with one or more embodiments.

FIG. 17 depicts an example implementation scenario 1700 that illustrates movement of the kickstand 302 and the hinge 1000 from the position 300 to the position 500. The upper portion of the scenario 1700 depicts a partial view of the computing device 102 with the kickstand 302 and the hinge 1000 in the position 300. In the position 300, the biasing force from the tab spring 1114 (not shown) presses the lock tab 1112 against the ring guide 1102a.

Proceeding to the lower portion of the scenario 1700, the kickstand 302 and the hinge 1000 move from the position 300 to the position 500. In moving to the position 500, the tab notch 1106 in the ring guide 1102a allows biasing force from the tab spring 1114 to move the lock tab 1112 sideways and press the lock tab 1112 into the tab catch 1128, as depicted in FIG. 15.

In a scenario where the kickstand 302 is moved toward a closing position, the tab notch 1106 disengages the lock tab 1112 from the tab catch 1128. For instance, consider that a user closes the kickstand 302 from the position 500 depicted in the lower portion of the scenario 1700, to the position 300 depicted in the upper portion of the scenario 1700. Accordingly, the lock tab 1112 is pushed out of the tab notch 1106 such that the lock tab 1112 moves toward a center of the hinge 1000 and disengages from the tab catch 1128. As further detailed below, this enables the cam 1108 to disengage from the upper hinge ring 1118 and continue from the position 300 toward a closed position.

Figure 18:
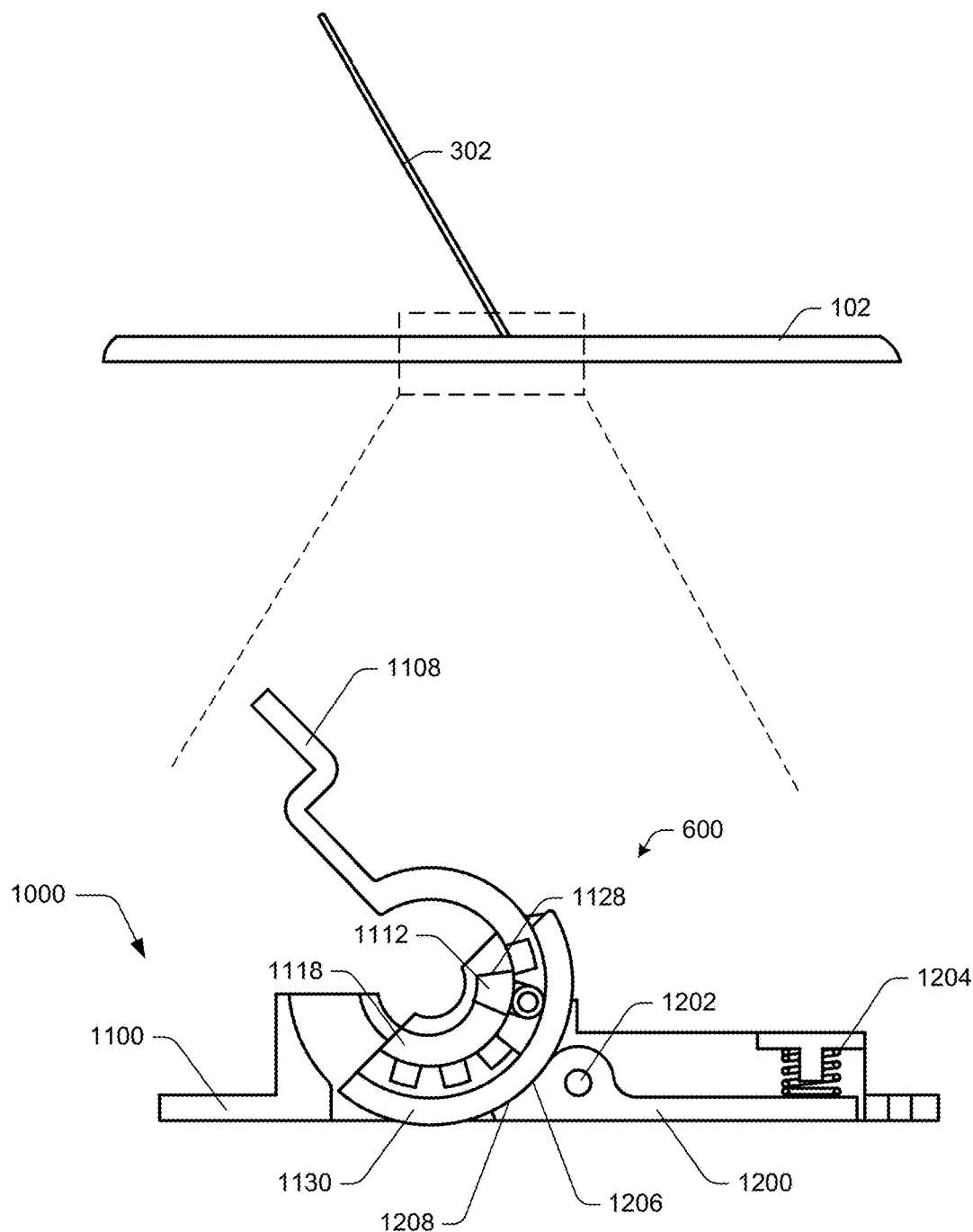
FIG. 18 depicts a side cross section view of an example hinge in accordance with one or more embodiments.

FIG. 18 depicts a side cross-section view of the hinge 1000 opened to the position 600 in accordance with one or more implementations. For instance, a user opens the kickstand 302 from the position 500 to the position 600 introduced with reference to FIG. 6. This side view illustrates the hinge frame 1100, the cam 1108, the upper hinge ring 1118, and the lower hinge ring 1130.

As shown in FIG. 18, opening of the hinge 1000 past the position 500 causes the upper hinge ring 1118 and the lower hinge ring 1130 to move along with the cam 1108. For instance, engagement of the lock tab 1112 with the tab catch 1128 in the upper hinge ring 1118 engages the cam 1108 with the upper hinge ring 1118. Further, the upper hinge ring 1118 and the lower hinge ring 1130 are engaged with one another via interlocking of their respective ring teeth. Accordingly, opening of the cam 1108 past the position 500 brings the upper hinge ring 1118 and the lower hinge ring 1130 along with the cam 1108.

As discussed above, spring force from the bar spring 1204 presses downward on the friction bar 1200, which causes the friction bar 1200 to pivot about the pivot pin 1202 such that the contact interface 1206 bears against the outer surface 1208 of the lower hinge ring 1130. According to various implementations, this contact between the contact interface 1206 and the outer surface 1208 represents a friction engine and/or friction assembly that determines a torque profile of the hinge 1000 at certain open positions. For instance, movement of the cam 1108 past the position 500 is resisted by the frictional interface between the contact interface 1206 of the friction bar 1200 and the outer surface 1208 of the lower hinge ring 1130. Opening movement of the cam 1108 past the position 500, for example, represents a transition from the first friction range 504 to the second friction range 506.

According to various implementations, torque response in the second friction range 506 can be customized by adjusting a length of the friction bar 1200. For instance, a shorter friction bar 1200 may apply less frictional force against the lower hinge ring 1130 than a longer friction bar. Thus, torque required to move the cam 1108 in the second friction range 506 may be increased by lengthening the portion of the friction bar 1200 between the pivot pin 1202 and the bar spring 1204, and may be decreased by shortening the same portion of the friction bar 1200.

Figure 19:
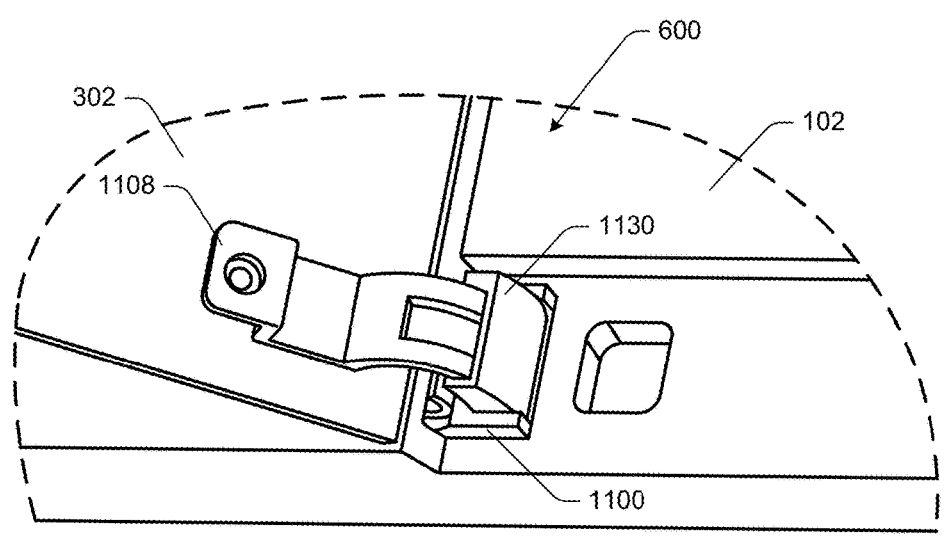
FIG. 19 depicts a partial side view of a computing device with a kickstand opened to a particular position in accordance with one or more embodiments.

FIG. 19 depicts a partial side view of the computing device 102 with the kickstand 302 opened to the position 600 in accordance with one or more implementations. This particular view shows the cam 1108 attached to the kickstand 302 and the lower hinge ring 1130 partially protruding from the hinge frame 1100. As discussed above, movement of the cam 1108 to the position 600 causes the lock tab 1112 to drag the upper hinge ring 1118 and the lower hinge ring 1130 along with the cam 1108.

Figure 20:
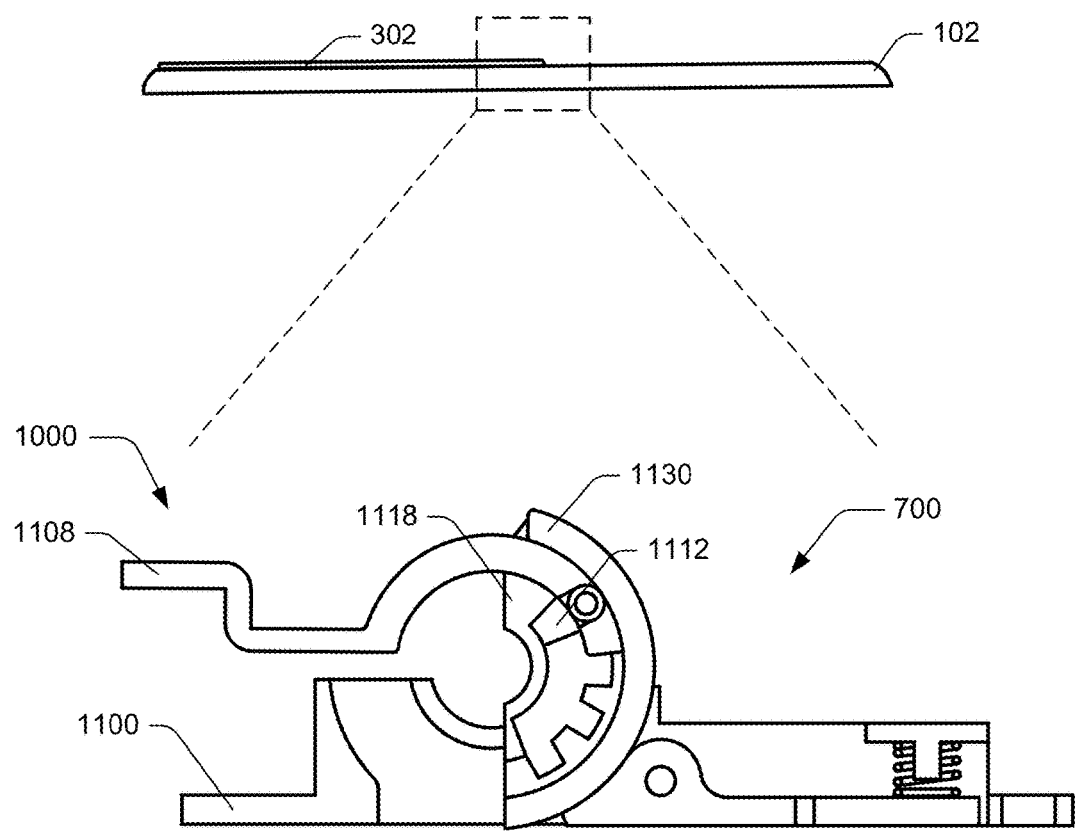
FIG. 20 depicts a side cross section view of an example hinge in accordance with one or more embodiments.

FIG. 20 depicts a side cross-section view of the hinge 1000 opened to the position 700 in accordance with one or more implementations. For instance, a user opens the kickstand 302 from the position 600 to the position 700 introduced with reference to FIG. 7. This side view illustrates the hinge frame 1100, the cam 1108, the upper hinge ring 1118, and the lower hinge ring 1130. FIG. 19 further depicts that in the position 700, the lower hinge ring 1130 and the upper hinge ring 1118 partially protrude from the hinge frame 1100. For instance, movement of the cam 1108 from the position 600 to the position 700 causes the lock tab 1112 to drag the upper hinge ring 1118 and the lower hinge ring 1130 along with the cam 1108.

As discussed above, the position 700 represents a maximum open position for the hinge 1000 in at least some implementations. Generally, resistance of movement of the hinge 1000 from the position 600 to the position 700 is according to the second friction range 506.

Figure 21:
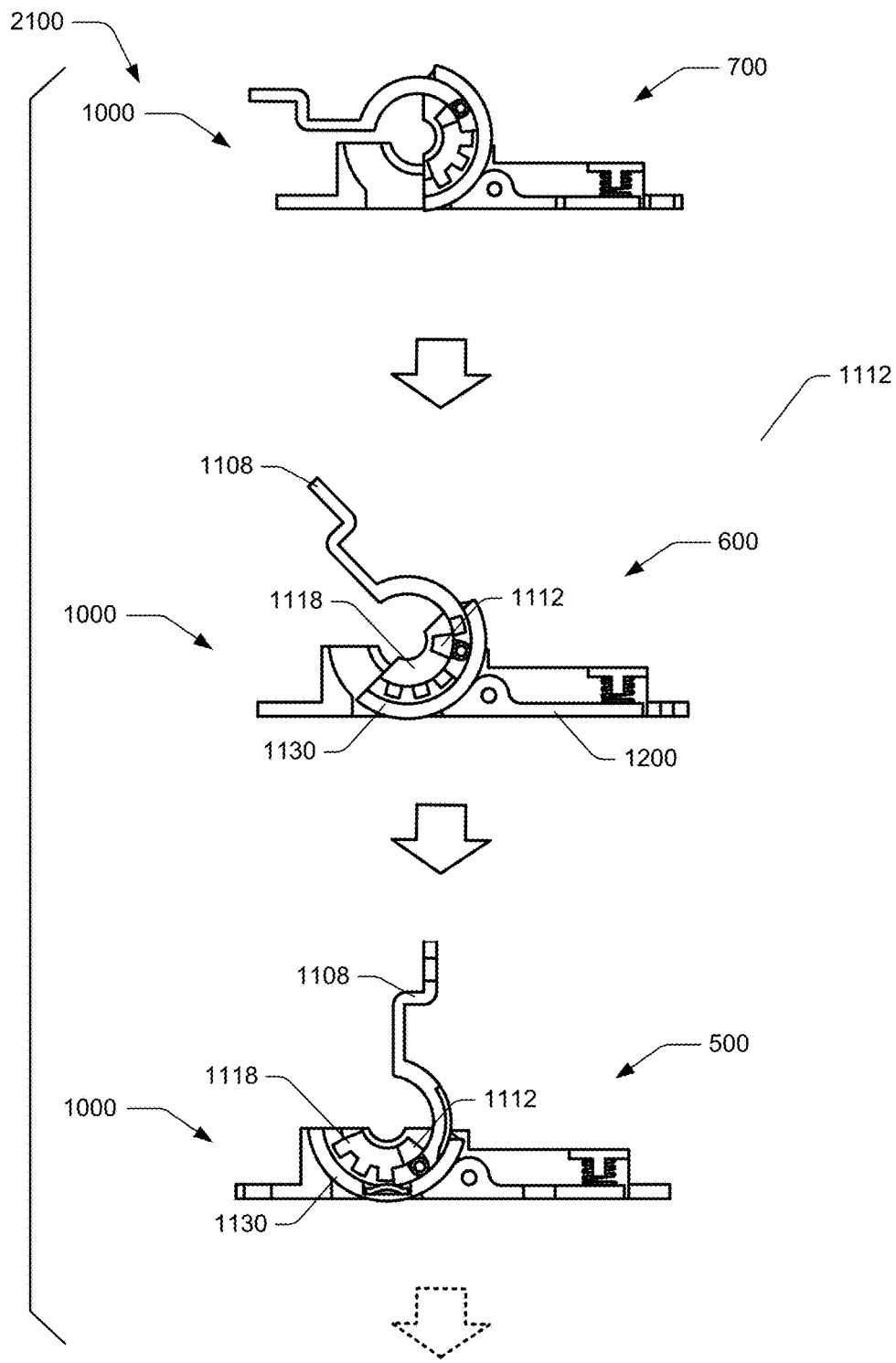
FIG. 21 depicts an example implementation scenario for closing a hinge in accordance with one or more embodiments.

FIG. 21 depicts an example implementation scenario 2100 for closing of the hinge 1000 in accordance with one or more implementations. The top portion of the scenario 2100 illustrates the hinge 1000 in the position 700. Proceeding to the center portion of the scenario 2100, the hinge 1000 is rotated in a closing direction from the position 700 to the position 600. For instance, a user manipulates the kickstand 302 towards a closing position from the position 700 to the position 600. As illustrated, the upper hinge ring 1118 and the lower hinge ring 1130 move along with the cam 1108. For instance, engagement of the lock tab 1112 within the tab catch 1128 enables the cam 1108 to push the upper hinge ring 1118 and the lower hinge ring 1130 toward a closed position.

Further, resistance to closing of the cam 1108 from the position 700 to the position 600 is based on frictional interaction between the friction bar 1200 and the lower hinge ring 1130. Torque response to closing the cam 1108 from the position 700 to the position 600, for example, is based on the second friction range 506.

Proceeding from the center portion to the lower portion of the scenario 2100, the hinge 1000 is rotated in a closing direction from the position 600 to the position 500. For instance, a user manipulates the kickstand 302 towards a closing position from the position 600 to the position 500. As illustrated, the upper hinge ring 1118 and the lower hinge ring 1130 move along with the cam 1108. For instance, engagement of the lock tab 1112 within the tab catch 1128 enables the cam 1108 to push the upper hinge ring 1118 and the lower hinge ring 1130 toward a closed position. The scenario 2100 then proceeds to a scenario 2200, discussed below.

Figure 22:
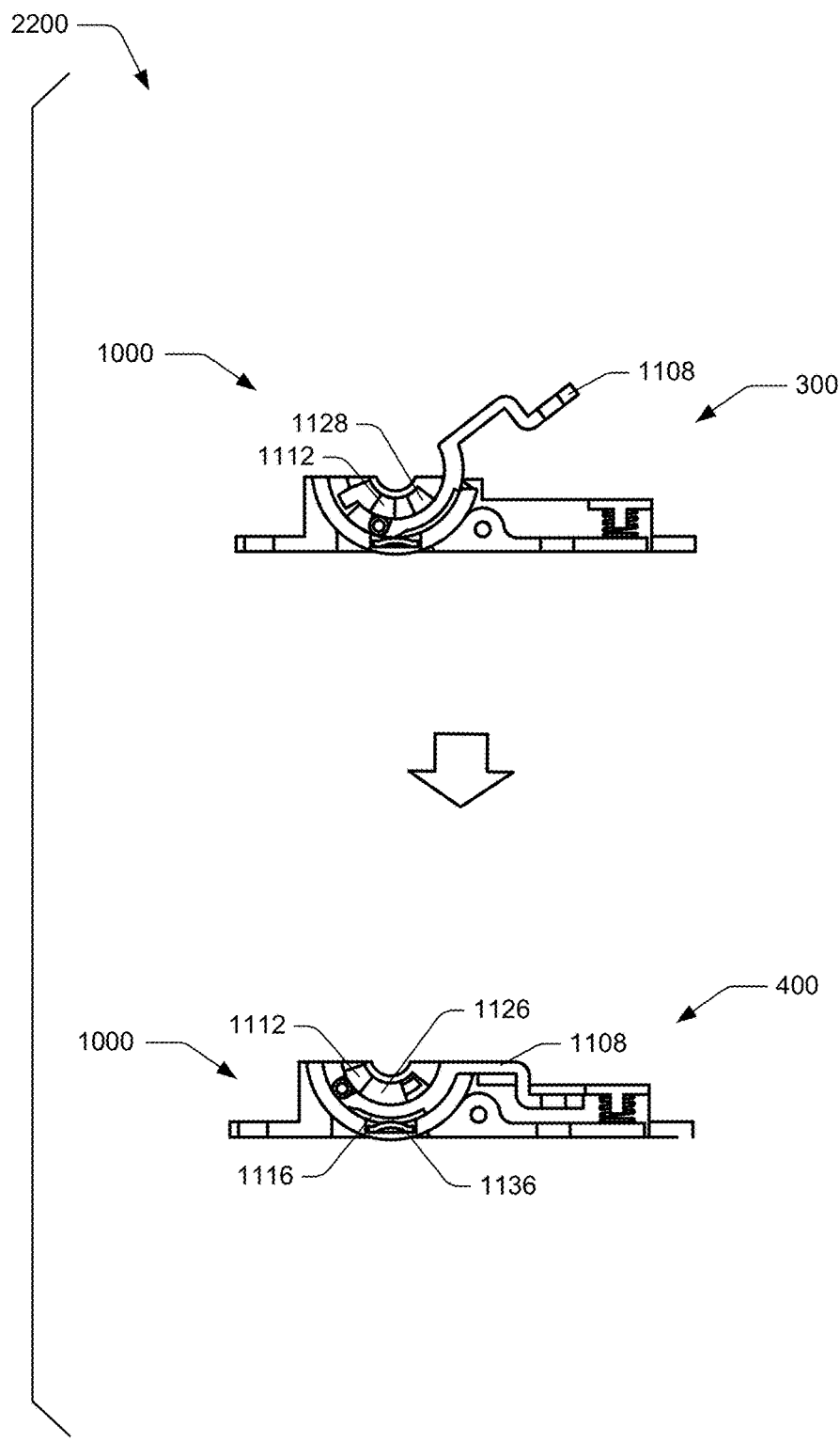
FIG. 22 depicts an example implementation scenario for closing a hinge in accordance with one or more embodiments.

FIG. 22 depicts an example implementation scenario 2200 for closing of the hinge 1000 in accordance with one or more implementations. The scenario 2200, for instance, represents a continuation of the scenario 2100. The top portion of the scenario 2100 illustrates that the hinge 1000 is moved in a closing direction from the position 500 to the position 300. According to various implementations, moving the cam 1108 in a closing direction from the position 500 causes the lock tab 1112 to disengage from the tab catch 1128. For instance, as detailed above, a tab notch 1106 in the ring guide 1102a pushes the lock tab 1112 out of the tab catch 1128 such that the lock tab 1112 and thus the cam 1108 disengages from the lower hinge ring 1130.

According to various implementations, closing of the hinge 1000 past the position 500 represents a transition of the hinge 1000 from the second friction range 506 to the first friction range 504. For instance, at the position 500, the cam 1108 engages with the lower ring spring 1136. Thus, frictional interaction between the cam 1108 and the lower ring spring 1136 determines a torque response of the hinge 1000 when the hinge 1000 is closed further from the position 500.

Continuing to the lower portion of the scenario, the hinge 1000 is moved in a closing direction from the position 300 to the position 400, e.g., a closed position. During movement to the position 400, the lock tab 1112 moves within the upper ring groove 1126. According to various implementations, closing the cam 1108 further from the position 300 represents a transition from the first friction range 504 to the closing range 502. For instance, closing the cam 1108 further from the position 300 causes the cam 1108 to disengage from the lower ring spring 1136 such that the kickstand 302 can snap into a closed position. As detailed above, dimensions of the spring groove 1116 in the cam 1108 are such that when the spring groove 1116 is positioned over the lower ring spring 1136, the lower ring spring 1136 does not engage with the cam 1108.

Thus, implementations discussed herein describe a multistage friction hinge with a torque profile that varies over different angle ranges. While implementations are discussed with reference to a particular number of friction stages, it is to be appreciated that implementations discussed herein can be employed to construct a hinge with any suitable number of friction stages. It is to be appreciated that usage of the terms "upper," "lower," and other relative terms is not to be construed as limiting, and this terminology is simply utilized for purposes of illustration.

Having discussed some example hinge positions and configurations, consider now an example system that can employ the example hinge configurations in accordance with one or more implementations.

Example System and Device

Figure 23:
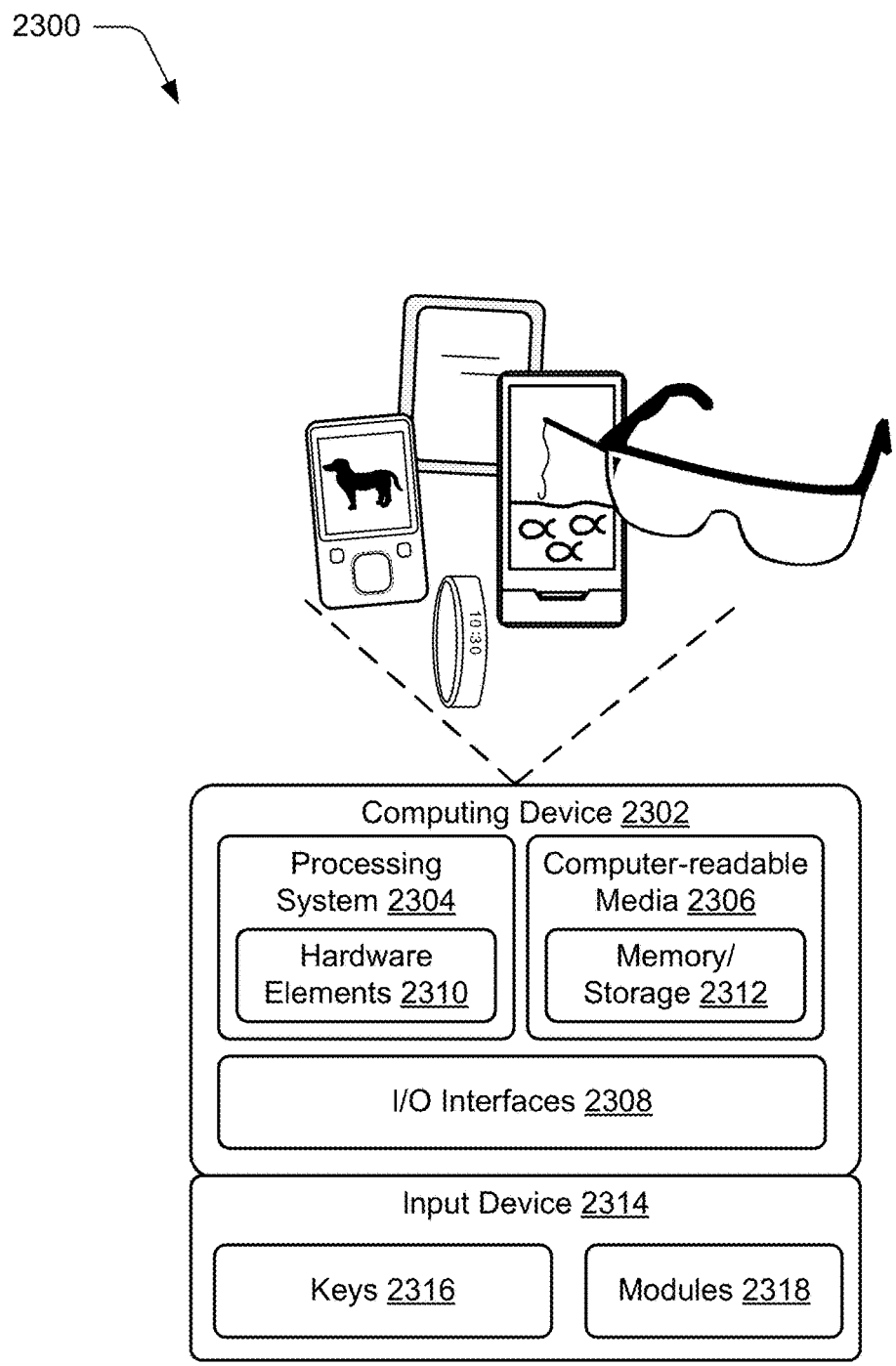
FIG. 23 illustrates an example system including various components of an example device that can be implemented as any type of computing device as described with reference to FIGS. 1-22 to implement embodiments of the techniques described herein.

FIG. 23 illustrates an example system generally at 2300 that includes an example computing device 2302 that is representative of one or more computing systems and/or devices that may implement the various techniques described herein. In at least some implementations, the computing device 2302 represents an implementation of the computing device 102 discussed above. The computing device 2302 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 2302 as illustrated includes a processing system 2304, one or more computer-readable media 2306, and one or more I/O interface 2308 that are communicatively coupled, one to another. Although not shown, the computing device 2302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2304 is representative of functionality to perform one or more operations using hardware. Accordingly, the processing system 2304 is illustrated as including hardware element 2310 that may be configured as processors, functional blocks, and so forth. This may include implementation in hardware as an application specific integrated circuit or other logic device formed using one or more semiconductors. The hardware elements 2310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2306 is illustrated as including memory/storage 2312. The memory/storage 2312 represents memory/storage capacity associated with one or more computer-readable media. The memory/storage component 2312 may include volatile media (such as random access memory (RAM)) and/or nonvolatile media (such as read only memory (ROM), Flash memory, optical disks, magnetic disks, and so forth). The memory/storage component 2312 may include fixed media (e.g., RAM, ROM, a fixed hard drive, and so on) as well as removable media (e.g., Flash memory, a removable hard drive, an optical disc, and so forth). The computer-readable media 2306 may be configured in a variety of other ways as further described below.

Input/output interface(s) 2308 are representative of functionality to allow a user to enter commands and information to computing device 2302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2302 may be configured in a variety of ways to support user interaction.

The computing device 2302 is further illustrated as being communicatively and physically coupled to an input device 2314 that is physically and communicatively removable from the computing device 2302. In this way, a variety of different input devices may be coupled to the computing device 2302 having a wide variety of configurations to support a wide variety of functionality. In this example, the input device 2314 includes one or more keys 2316, which may be configured as pressure sensitive keys, mechanically switched keys, and so forth.

The input device 2314 is further illustrated as include one or more modules 2318 that may be configured to support a variety of functionality. The one or more modules 2318, for instance, may be configured to process analog and/or digital signals received from the keys 2316 to determine whether a keystroke was intended, determine whether an input is indicative of resting pressure, support authentication of the input device 2314 for operation with the computing device 2302, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2302, such as via a network. Signal media typically may embody computer readable instructions, data structures, program modules, or other data in a modulated data signal, such as carrier waves, data signals, or other transport Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2310 and computer-readable media 2306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2310. The computing device 2302 may be configured to implement particular instructions and/or functions corresponding to the software and/or hardware modules. Accordingly, implementation of a module that is executable by the computing device 2302 as software may be achieved at least partially in hardware, e.g., through use of computer-readable storage media and/or hardware elements 2310 of the processing system 2304. The instructions and/or functions may be executable/operable by one or more articles of manufacture (for example, one or more computing devices 2302 and/or processing systems 2304) to implement techniques, modules, and examples described herein.

Implementations discussed herein include:

Example 1

A device including: a support movably attached to a rear portion of the device; and at least one multistage friction hinge that moveably attaches a portion of the support to the device, the hinge including: a first angle range in which resistance to movement of the hinge is determined based on engagement of a first friction engine of the hinge; and a second angle range in which resistance to movement of the hinge is determined based on engagement of a second friction engine of the hinge.

Example 2

A device as described in example 1, wherein the first angle range represents a first set of angles of the support relative to the rear portion of the device, and the second angle range represents a second set of angles of the support relative to the rear portion of the device, and wherein the second set of angles is different than the first set of angles.

Example 3

A device as described in one or more of examples 1 or 2, wherein the first angle range represents a first set of open angles of the support relative to the rear portion of the device, and the second angle range represents a second set of open angles of the support relative to the rear portion of the device, and wherein the second set of angles includes greater open angles than the first set of angles.

Example 4

A device as described in one or more of examples 1-3, wherein movement of the hinge from the first angle range to the second angle range causes a transition from the first friction engine to the second friction engine.

Example 5

A device as described in one or more of examples 1-4, wherein opening of the hinge from the first angle range to the second angle range causes a transition from the first friction engine to the second friction engine.

Example 6

A device as described in one or more of examples 1-5, wherein closing of the hinge from the second angle range to the first angle range causes a transition from the second friction engine to the first friction engine.

Example 7

A device as described in one or more of examples 1-6, wherein resistance to movement of the hinge is greater in the second angle range than in the first angle range.

Example 8

A device as described in one or more of examples 1-7, wherein the first friction engine is based on spring force from a first spring of the hinge, and wherein the second friction engine is based on spring force from a second spring of the hinge.

Example 9

A device as described in one or more of examples 1-8, wherein the first angle range represents a first set of open angles of the support relative to the rear portion of the device, and the second angle range represents a second set of open angles of the support relative to the rear portion of the device, wherein the hinge further includes a third angle range that represents a range of angles between a closed position of the support relative to the rear portion of the computing device and the first angle range, and wherein resistance to movement of the hinge in the third angle range is less than resistance to movement of the hinge in the first angle range and the second angle range.

Example 10

A hinge including: a first friction assembly configured to provide resistance to movement of the hinge across a first angle range; and a second friction assembly configured to provide resistance to movement of the hinge across a second angle range.

Example 11

A hinge as described in example 10, wherein the second friction assembly provides greater resistance to movement of the hinge than does the first friction assembly.

Example 12

A hinge as described in one or more of examples 10 or 11, wherein the first friction assembly is based on frictional interaction between a first set of components of the hinge, and wherein the second friction assembly is based on frictional interaction between a second set of components of the hinge, the second set of components being different than the first set of components.

Example 13

A hinge as described in one or more of examples 10-12, wherein the hinge includes: a hinge frame including at least one ring guide; an upper hinge ring slidably engaged with the at least one ring guide; a lower hinge ring interlocked with the upper hinge ring and including a lower ring spring disposed on an inner surface of the lower hinge ring; and a cam positioned at least in part between the upper hinge ring and the lower hinge ring such that when the hinge is positioned within the first angle range, the cam engages with the lower ring spring to form at least a part of the first friction assembly.

Example 14

A hinge as described in one or more of examples 10-13, wherein the hinge includes: a hinge frame including at least one ring guide; an upper hinge ring slidably engaged with the at least one ring guide; a lower hinge ring interlocked with the upper hinge ring; a friction bar pivotably attached to the hinge frame and positioned such that a first portion of the friction bar is in contact with the lower hinge ring; a bar spring disposed within the hinge frame to apply biasing force to a second portion of the friction bar to cause the first portion of the friction bar to bear against the lower hinge ring; and a cam positioned at least in part between the upper hinge ring and the lower hinge ring such that when the cam is positioned within the second angle range, frictional force applied by the first portion of the friction bar against the lower hinge ring resists movement of the cam relative to the hinge frame and forms at least a part of the second friction assembly.

Example 15

A hinge as described in one or more of examples 10-14, wherein the hinge includes: a hinge frame including at least one ring guide; an upper hinge ring slidably engaged with the at least one ring guide; a lower hinge ring interlocked with the upper hinge ring; a friction bar pivotably attached to the hinge frame and positioned such that a first portion of the friction bar is in contact with the lower hinge ring; a bar spring disposed within the hinge frame to apply biasing force to a second portion of the friction bar to cause the first portion of the friction bar to bear against the lower hinge ring; and a cam positioned at least in part between the upper hinge ring and the lower hinge ring and including a spring biased locking tab such that when the cam transitions from the first angle range to the second angle range, the locking tab engages with the upper hinge ring and movement of the cam within the second angle range causes corresponding movement of the upper hinge ring and the lower hinge ring, and frictional force applied by the first portion of the friction bar against the lower hinge ring resists movement of the cam relative to the hinge frame and forms at least a part of the second friction assembly.

Example 16

An apparatus including: a chassis; a moveable component moveably attached to the chassis; and a multistage friction hinge that moveably attaches the moveable component to the chassis, the multistage friction hinge including: a first friction engine that provides resistance to movement of the moveable component across a first angle range; and a second friction engine that provides resistance to movement of the moveable component across a second angle range.

Example 17

An apparatus as described in example 16, wherein the moveable component includes a support component that is moveable via the multistage friction hinge to different angles relative to the chassis to support different orientations of the chassis relative to an adjacent surface.

Example 18

An apparatus as described in one or more of examples 16 or 17, wherein the apparatus includes a computing device, the chassis includes a display device, and wherein the moveable component includes a support component that is moveable via the multistage friction hinge to support different viewing angles for the display device.

Example 19

An apparatus as described in one or more of examples 16-18, wherein the second friction engine provides greater resistance to movement of the moveable component in the second angle range than the first friction engine in the first angle range.

Example 20

An apparatus as described in one or more of examples 16-19, wherein movement of the moveable component from the first angle range to the second angle range causes the multistage friction hinge to transition from the first friction engine to the second friction engine.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A device comprising:
    a support movably attached to a rear portion of the device; and
    at least one multistage friction hinge that moveably attaches a portion of the support to the device, the hinge including:
    a first angle range in which resistance to movement of the hinge is determined based on engagement of a first friction engine of the hinge; and
    a second angle range in which resistance to movement of the hinge is determined based on engagement of a second friction engine of the hinge, the hinge further including:
    a hinge frame;
    an upper hinge ring slidably engaged with the hinge frame;
    a lower hinge ring interlocked with the upper hinge ring; and
    a cam attached to the support and positioned at least in part between the upper hinge ring and the lower hinge ring, the cam including a spring biased locking tab such that when the cam transitions from the first angle range to the second angle range, the locking tab engages with the upper hinge ring and movement of the cam within the second angle range causes corresponding movement of the upper hinge ring and the lower hinge ring to form at least a part of the second friction engine.

2. A device as described in claim 1, wherein the first angle range represents a first set of angles of the support relative to the rear portion of the device, and the second angle range represents a second set of angles of the support relative to the rear portion of the device, and wherein the second set of angles is different than the first set of angles.

3. A device as described in claim 1, wherein the first angle range represents a first set of open angles of the support relative to the rear portion of the device, and the second angle range represents a second set of open angles of the support relative to the rear portion of the device, and wherein the second set of angles includes greater open angles than the first set of angles.

4. A device as described in claim 1, wherein movement of the hinge from the first angle range to the second angle range causes a transition from the first friction engine to the second friction engine.

5. A device as described in claim 1, wherein opening of the hinge from the first angle range to the second angle range causes a transition from the first friction engine to the second friction engine.

6. A device as described in claim 1, wherein closing of the hinge from the second angle range to the first angle range causes a transition from the second friction engine to the first friction engine.

7. A device as described in claim 1, wherein resistance to movement of the hinge is greater in the second angle range than in the first angle range.

8. A device as described in claim 1, wherein the first friction engine is based on spring force from a first spring of the hinge, and wherein the second friction engine is based on spring force from a second spring of the hinge.

9. A device as described in claim 1, wherein the first angle range represents a first set of open angles of the support relative to the rear portion of the device, and the second angle range represents a second set of open angles of the support relative to the rear portion of the device, wherein the hinge further includes a third angle range that represents a range of angles between a closed position of the support relative to the rear portion of the device and the first angle range, and wherein resistance to movement of the hinge in the third angle range is less than resistance to movement of the hinge in the first angle range and the second angle range.

10. A device comprising:
a support movably attached to a rear portion of the device; and
a hinge that moveably attaches a portion of the support to the device, the hinge including:
a hinge frame;
an upper hinge ring slidably engaged with the hinge frame;
a lower hinge ring interlocked with the upper hinge ring; and
a cam attached to the support and positioned at least in part between the upper hinge ring and the lower hinge ring, the cam including a spring biased locking tab such that when the cam transitions from a first angle range of the hinge to a second angle range of the hinge, the locking tab engages with the upper hinge ring and movement of the cam within the second angle range causes corresponding movement of the upper hinge ring and the lower hinge ring from the first angle range to the second angle range.

11. A device as described in claim 10, wherein the support is configured to support the device at different positions relative to an adjacent surface.

12. A device as described in claim 10, wherein the first angle range represents a first set of angles of the support relative to the rear portion of the device, and the second angle range represents a second set of angles of the support relative to the rear portion of the computing device, and wherein the second set of angles is different than the first set of angles.

13. A device as described in claim 10, wherein resistance to movement of the hinge is greater in the second angle range than in the first angle range.

14. A device as described in claim 10, wherein resistance to movement of the hinge increases as the hinge moves from the first angle range to the second angle range.

15. A device as described in claim 10, wherein resistance to movement of the hinge in the first angle range is based on spring force from a first spring of the hinge, and wherein resistance to movement of the hinge in the second angle range is based on spring force from a second spring of the hinge.

16. A device comprising:
a support movably attached to a rear portion of the device; and
a hinge that moveably attaches a portion of the support to the device, the hinge including:
a hinge frame;
an upper hinge ring slidably engaged with the hinge frame;
a lower hinge ring interlocked with the upper hinge ring; and
a cam attached to the support and positioned at least in part between the upper hinge ring and the lower hinge ring, the cam including a spring biased locking tab such that when the cam transitions from a first open position to a second open position of the hinge, the locking tab engages with the upper hinge ring and movement of the cam from the first open position to the second open position causes corresponding movement of the upper hinge ring and the lower hinge ring.

17. A device as described in claim 16, wherein the device comprises a computing device, and wherein the support is configured to support the computing device at different positions relative to an adjacent surface.

18. A device as described in claim 16, wherein resistance to movement of the hinge is greater when opening past the second open position than opening from a closed position to the second open position.

19. A device as described in claim 16, wherein resistance to movement of the hinge increases as the hinge opens past the second open position.

20. A device as described in claim 16, wherein resistance to movement of the hinge from the first open position to the second open position is based on spring force from a first spring of the hinge, and wherein resistance to opening of the hinge past the second open position is based on spring force from a second spring of the hinge.

* * * * *